US011836849B2

(12) United States Patent
Yang et al.

(10) Patent No.: US 11,836,849 B2
(45) Date of Patent: *Dec. 5, 2023

(54) PRIMITIVE BLOCK GENERATOR FOR GRAPHICS PROCESSING SYSTEMS

(71) Applicant: Imagination Technologies Limited, Kings Langley (GB)

(72) Inventors: Xile Yang, Rickmansworth (GB); Robert Brigg, Watford (GB); John W. Howson, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,095

(22) Filed: Nov. 29, 2022

(65) Prior Publication Data

US 2023/0090166 A1 Mar. 23, 2023

Related U.S. Application Data

(63) Continuation of application No. 17/536,671, filed on Nov. 29, 2021, now Pat. No. 11,527,039, which is a (Continued)

(30) Foreign Application Priority Data

Dec. 21, 2018 (GB) ........................................ 1821133
Dec. 21, 2018 (GB) ........................................ 1821139
Dec. 21, 2018 (GB) ........................................ 1821142

(51) Int. Cl.
G06T 15/40 (2011.01)
G06T 15/00 (2011.01)
G06T 1/60 (2006.01)

(52) U.S. Cl.
CPC ................ G06T 15/40 (2013.01); G06T 1/60 (2013.01); G06T 15/005 (2013.01)

(58) Field of Classification Search
CPC .......... G06T 15/40; G06T 1/60; G06T 15/005
See application file for complete search history.

(56) References Cited

U.S. PATENT DOCUMENTS 5,652,864 A 7/1997 Hine
6,229,553 B1 5/2001 Matsushita et al.
(Continued)

FOREIGN PATENT DOCUMENTS

EP 3671650 A1 6/2020
EP 3671651 A1 6/2020
(Continued)

Primary Examiner — Terrell M Robinson
(74) Attorney, Agent, or Firm — Potomac Law Group, PLLC; Vincent M. DeLuca

(57) ABSTRACT

Methods and primitive block generators for generating primitive blocks in a graphics processing system. The methods comprise: receiving transformed position data for a current primitive, the transformed position data indicating a position of the current primitive in rendering space; determining a distance between the position of the current primitive and a position of a current primitive block based on the transformed position data for the current primitive; determining whether to add the current primitive to the current primitive block based on the distance and a fullness of the current primitive block; in response to determining that the current primitive is to be added to the current primitive block, adding the current primitive to the current primitive block; and in response to determining that the current primitive is not to be added to the current primitive block, flushing the current primitive block and adding the current primitive to a new current primitive block.

20 Claims, 17 Drawing Sheets

Related U.S. Application Data continuation of application No. 16/724,239, filed on Dec. 21, 2019, now Pat. No. 11,217,007.

(56) References Cited

U.S. PATENT DOCUMENTS

| | | | |
|---|---|---|---|
| 6,380,935 B1* | 4/2002 | Heeschen | G06T 15/005 345/423 |
| 6,697,063 B1* | 2/2004 | Zhu | G06T 15/005 345/422 |
| 8,130,222 B1 | 3/2012 | Rockwell | |
| 8,704,826 B1 | 4/2014 | Hakura et al. | |
| 9,953,456 B2 | 4/2018 | Howson | |
| 2007/0165035 A1 | 7/2007 | Duluk, Jr. et al. | |
| 2009/0147016 A1* | 6/2009 | Barone | G06T 15/005 345/581 |
| 2009/0201307 A1* | 8/2009 | Barone | G06T 15/005 345/581 |
| 2014/0118369 A1 | 5/2014 | Hakura et al. | |
| 2014/0118391 A1 | 5/2014 | Hakura et al. | |
| 2014/0139537 A1 | 5/2014 | Tapply et al. | |
| 2014/0229701 A1 | 8/2014 | Jaquet | |
| 2014/0347357 A1* | 11/2014 | Kim | G06T 11/40 345/420 |
| 2014/0354682 A1 | 12/2014 | Heggelund et al. | |
| 2015/0015575 A1 | 1/2015 | Gierach et al. | |
| 2015/0193903 A1 | 7/2015 | Agarwal et al. | |
| 2015/0348306 A1 | 12/2015 | Yang et al. | |
| 2015/0363969 A1 | 12/2015 | Yang | |
| 2016/0260249 A1 | 9/2016 | Persson et al. | |
| 2017/0061678 A1 | 3/2017 | Engh-Halstvedt et al. | |
| 2017/0069132 A1 | 3/2017 | Howson et al. | |
| 2017/0315928 A1 | 11/2017 | Hangud et al. | |
| 2018/0197268 A1 | 7/2018 | Grantham et al. | |
| 2018/0211439 A1 | 7/2018 | Howson | |
| 2018/0240268 A1 | 8/2018 | Nevraev et al. | |

FOREIGN PATENT DOCUMENTS

| | | |
|---|---|---|
| EP | 3671652 A1 | 6/2020 |
| GB | 2458488 A | 9/2009 |
| GB | 2500284 A | 9/2013 |
| GB | 2506706 B | 9/2014 |
| GB | 2526598 A | 12/2015 |
| GB | 2542133 A | 3/2017 |
| GB | 2567436 A | 4/2019 |
| KR | 100859651 B | 9/2008 |
| WO | 02/23341 A1 | 3/2002 |

\* cited by examiner

PRIMITIVE BLOCK GENERATOR FOR GRAPHICS PROCESSING SYSTEMS

CROSS-REFERENCE TO RELATED APPLICATIONS AND CLAIM OF PRIORITY

This application is a continuation under 35 U.S.C. 120 of copending application Ser. No. 17/536,671 filed Nov. 29, 2021, now U.S. Pat. No. 11,527,039, which is a continuation of prior application Ser. No. 16/724,239 filed Dec. 21, 2019, now U.S. Pat. No. 11,217,007, which claims foreign priority under 35 U.S.C. 119 from United Kingdom Application Nos. 1821133.4, 1821139.1, and 1821142.5, all filed Dec. 21, 2018.

BACKGROUND

Graphics processing systems are configured to receive graphics data, e.g. from an application (e.g. a game application) running on a computer system, and to render an image from the graphics data to provide a rendering output. For example, an application may generate a 3D model of a scene and output geometry data representing the objects in the scene. In particular, the application may divide each object into a plurality of primitives (i.e. simple geometric shapes, such as, but not limited to rectangles, triangles, lines and points to which a texture can be applied) which are defined by the position of one or more vertices. In these cases, the geometry data output by the application may include information identifying each vertex (e.g. the coordinates of the vertex in world space) and information indicating the primitives formed by the vertices. The graphics processing system then converts the received geometry data into an image that may be displayed on the screen.

A graphics processing system may, for example, implement immediate mode rendering (IMR) or tile-based rendering (TBR). In IMR the entire scene is rendered as a whole. In contrast, in TBR a scene is rendered using a rendering space which is divided into subsections, which are referred to as tiles, wherein at least a portion of the rendering process may be performed independently for each tile. The tiles may have any suitable shape, but are typically rectangular (wherein the term "rectangular" includes square). An advantage of TBR is that fast, on-chip memory can be used during the rendering for colour, depth and stencil buffer operations, which allows a significant reduction in system memory bandwidth over IMR, without requiring on-chip memory that is large enough to store data for the entire scene at the same time.

TBR involves two key phases: a geometry processing phase; and a rasterization phase. During the geometry processing phase the geometry data (e.g. vertices defining primitives) received from an application (e.g. a game application) is transformed from world space coordinates into screen space coordinates. A per-tile list is then created of the transformed primitives (e.g. triangles) that fall at least partially within the bounds of the tile. During the rasterization phase each tile is rendered separately (i.e. the transformed primitives are mapped to pixels and the colour is identified for each pixel in the tile). This may comprise identifying which primitive(s) are visible at each pixel. The colour of each pixel may then be determined by the appearance of the visible primitive(s) at that pixel which may be defined by a texture applied at that pixel and/or the pixel shader program run on that pixel. A pixel shader program describes operations that are to be performed for given pixels. Rendering each tile separately enables the graphics processing system to only retrieve the transformed primitive data related to a particular tile when rendering that tile in the rasterization phase, which keeps bandwidth requirements for the memory (e.g. intermediate buffer) to a minimum. Once a colour value has been identified for each pixel the colour values are written out to memory (e.g. a frame buffer) until the entire scene has been rendered. Once the entire scene has been rendered the scene may be, for example, displayed on a screen.

FIG. 1 illustrates an example TBR graphics processing system 100. The system 100 comprises memory $102_1$, $102_2$, $102_3$, $102_4$, geometry processing logic 104 and rasterization logic 106. Two or more of the memories $102_1$, $102_2$, $102_3$, and $102_4$ may be implemented in the same physical unit of memory.

The geometry processing logic 104 implements the geometry processing phase of TBR. The geometry processing logic 104 comprises transformation logic 108 and a tiling engine 110. The transformation logic 108 receives geometry data (e.g. vertices, primitives and/or patches) from an application (e.g. a game application) and transforms the geometry data into the rendering space (e.g. screen space). The transformation logic 108 may also perform functions such as clipping and culling to remove geometry data (e.g. primitives or patches) that falls outside of a viewing frustum, and/or apply lighting/attribute processing as is known to those of skill in the art. The transformed geometry data (e.g. vertices, primitives and/or patches) is (i) stored in the memory $102_2$, and (ii) provided to the tiling engine 110. The tiling engine 110 generates, from the transformed geometry data, a list, for each tile, of the transformed primitives that fall, at least partially, within that tile. The list may be referred to as a display list or a transformed display list. In some cases, the transformed display lists comprise pointers or links to the transformed geometry data (e.g. vertex data) related to the primitives that, at least partially, fall within the tile.

The rasterization logic 106 implements the rasterization phase of TBR. Specifically, the rasterization logic 106 renders the primitives in a tile-by-tile manner by fetching the display list for a tile from memory $102_3$ and then fetching the transformed geometry data from memory $102_2$ for the primitives that fall within the tile as indicated by the display list for that tile; and rendering the primitives for that tile based on the transformed geometry data.

In some cases, the rasterization logic 106 may comprise fetch logic 112, hidden surface removal (HSR) logic 114 and texturing/shading logic 116. In these cases, the fetch logic 112 fetches each of the display lists from memory $102_3$ and for each display list fetches the transformed geometry data from memory $102_2$ for the primitives that fall within a tile as specified by the corresponding display list. The transformed geometry data for a particular tile is then provided to the HSR logic 114 which removes primitive fragments which are hidden (e.g. hidden by other primitive fragments). The term "fragment" is used herein to mean a sample of a primitive at a sampling point, which is to be processed to render pixels of an image. In some examples, there may be a one-to-one mapping of pixels to fragments. However, in other examples there may be more fragments than pixels, and this oversampling can allow for higher quality rendering of pixel values, e.g. by facilitating anti-aliasing and other filters that may be applied to multiple fragments for rendering each of the pixel values.

The remaining fragments (after hidden surface removal) are then passed to the texturing/shading logic 116 which performs texturing and/or shading on the primitive fragments to determine pixel values of a rendered image. The rendered pixel values for a tile are then stored in memory $102_4$ (e.g. frame buffer).

The rasterization logic 106 processes each of the tiles and when the whole image has been rendered and stored in the memory $102_4$ (e.g. frame buffer) the image can be output from the graphics processing system 100 and used in any suitable manner, for example, displayed on a display, stored in memory, or transmitted to another device, etc. The TBR graphics processing system 100 shown in FIG. 1 is a "deferred" rendering system in the sense that fragments are processed by the HSR logic 114 before being processed by the texturing/shading logic 116. In other examples, the graphics processing system might not be a deferred rendering system in which case texturing/shading would be applied to fragments before HSR is applied to those fragments.

In many cases, the transformed geometry data can be quite large. This is particularly true where there is a large expansion ratio (e.g. when tessellation is performed by the transformation logic 108) between the untransformed geometry data and the transformed geometry data.

Accordingly, as described in UK Published Patent Applications GB2458488 and GB2542133 some TBR graphics processing systems use "untransformed display lists" that indicate which untransformed primitives, once transformed will fall, at least partially, within the bounds of each tile. As such, the untransformed display lists refer to untransformed primitives as opposed to transformed primitives. For example the untransformed display lists may comprise pointers or links to the untransformed geometry data (e.g. vertex data) related to the untransformed primitives that, when transformed, will, at least partially, fall within the tile. This means that the transformed geometry data does not need to be provided from the geometry processing logic 104 to the memory $102_2$, or stored in the memory $102_2$. However, in these systems the untransformed geometry data referred to in the untransformed display lists is transformed again in the rasterization phase. Although this means that the geometry data is transformed twice in some cases the benefits of avoiding the delay and memory usage of transferring the transformed geometry data to memory and storing it may outweigh the processing costs of performing a transformation in the rasterization phase.

FIG. 2 illustrates an example TBR graphics processing system 200 that uses untransformed display lists, similar to that described in GB2458488 and GB2542133, which may be referred to as an untransformed display list (UDL) graphics processing system. The system 200 is similar to the system 100 of FIG. 1 except (i) the transformed geometry data is not written to memory by the geometry processing logic; (ii) the display lists, instead of identifying the transformed primitives which fall within each tile, identify the untransformed primitives, which when transformed, will fall within each tile; and (iii) the rasterization logic includes transformation logic to transform the untransformed primitives referred to in the untransformed display lists. The system 200, like the system 100 of FIG. 1, comprises memory $202_1$, $202_3$, $202_4$, geometry processing logic 204 and rasterization logic 206.

The geometry processing logic 204, like the geometry processing logic 104 of FIG. 1, implements the geometry processing phase of TBR. The geometry processing logic 204 of FIG. 2 comprises transformation logic 208 and a tiling engine 210. The transformation logic 208 receives geometry data (e.g. vertices and primitives) from an application (e.g. a game application) and transforms the geometry data into the rendering space (e.g. screen space). The transformation logic 208 may also perform functions such as clipping and culling to remove geometry data (e.g. primitives) that falls outside of a viewing frustum. In contrast to the transformation logic 108 of FIG. 1, the transformation logic 208 of FIG. 2 may not apply lighting/attribute processing as only the position information is used by the geometry processing logic 204. The transformed geometry data (e.g. vertices and primitives) is provided to the tiling engine 210. The tiling engine 210 generates, from the transformed geometry data, a list, for each tile, of the untransformed primitives that, when transformed, fall, at least partially, within that tile. The lists that are generated by the tiling engine 201 of FIG. 2 may be referred to as untransformed display lists as they refer to untransformed geometry data as opposed to transformed geometry data.

The rasterization logic 206 shown in FIG. 2, like the rasterization logic 106 shown in FIG. 1, implements the rasterization phase of TBR. Specifically, the rasterization logic 206 renders the primitives in a tile-by-tile manner by fetching the untransformed geometry data for the primitives that fall within a tile as indicated by the untransformed display list for that tile, transforming the untransformed geometry data for that tile, and rendering the primitives for that tile based on the transformed geometry data.

In some cases, the rasterization logic 206 may comprise fetch logic 212, transformation logic 213, hidden surface removal (HSR) logic 214, and texturing/shading logic 216. In these cases, the fetch logic 212 fetches each of the untransformed display lists from memory $202_3$ and for each display list fetches the untransformed geometry data identified therein from memory $202_1$. The untransformed geometry data for a particular tile is then provided to the transformation logic 213 which transforms the untransformed geometry data (e.g. primitives) into the rendering space (e.g. screen space). The transformed geometry data for a particular tile is then provided to the HSR logic 214 which removes primitive fragments which are hidden (e.g. hidden by other primitive fragments). The remaining fragments (after hidden surface removal) are then passed to the texturing/shading logic 216 which performs texturing and/or shading on the primitive fragments to determine pixel values of a rendered image which can be passed to the memory $202_4$ (e.g. frame buffer) for storage.

The embodiments described below are provided by way of example only and are not limiting of implementations which solve any or all of the disadvantages of known UDL graphics processing systems.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and primitive block generators for generating primitive blocks in a graphics processing system. The methods comprise: receiving transformed position data for a current primitive, the transformed position data indicating a position of the current primitive in rendering space; determining a distance between the position of the current primitive and a position of a current primitive block based on the transformed position data for the current primitive; determining whether to add the current primitive to the current primitive block based on the distance and a fullness of the current primitive block; in response to determining that the current primitive is to be added to the current primitive block, adding the current primitive to the current primitive block; and in response to determining that the current primitive is not to be added to the current primitive block, flushing the current primitive block and adding the current primitive to a new current primitive block.

A first aspect provides a method of generating primitive blocks at a primitive block generator in a graphics processing system, the primitive block generator comprising a data store for storing a current primitive block to which primitives can be added, the method comprising: receiving transformed position data for a current primitive, the transformed position data indicating a position of the current primitive in rendering space; determining a distance between the position of the current primitive and a position of the current primitive block based on the transformed position data for the current primitive; determining whether to add the current primitive to the current primitive block based on (i) the distance, and (ii) a fullness of the current primitive block; in response to determining that the current primitive is to be added to the current primitive block, adding the current primitive to the current primitive block; and in response to determining that the current primitive is not to be added to the current primitive block, flushing the current primitive block and adding the current primitive to a new current primitive block.

A second aspect provides a primitive block generator in a graphics processing system for generating primitive blocks from a plurality of primitives, the primitive block generator comprising: a data store configured to store a current primitive block to which primitives can be added; and block allocation logic comprising: distance calculation logic configured to: receive transformed position data for a current primitive that indicates a position of the current primitive in rendering space; and determine a distance between the position of the current primitive and a position of the current primitive block based on the transformed position data for the primitive; comparison logic configured to: determine whether to add the current primitive to the current primitive block based on (i) the distance, and (ii) a fullness of the current primitive block; in response to determining that the current primitive is to be added to the current primitive block, cause the current primitive to be added the current primitive block; and in response to determining that the current primitive is not to be added to the current primitive block, cause the current primitive block to be flushed and the current primitive to be added to a new current primitive block.

A third aspect provides a graphics processing system comprising the primitive block generator of the second aspect.

The graphics processing systems, primitive block generators and caches described herein may be embodied in hardware on an integrated circuit. There may be provided a method of manufacturing, at an integrated circuit manufacturing system, the graphics processing systems, primitive block generators and caches described herein. There may be provided an integrated circuit definition dataset that, when processed in an integrated circuit manufacturing system, configures the system to manufacture the graphics processing systems, primitive block generators and caches described herein. There may be provided a non-transitory computer readable storage medium having stored thereon a computer readable description of a graphics processing system, a primitive block generator or a cache described herein that, when processed in an integrated circuit manufacturing system, causes the integrated circuit manufacturing system to manufacture an integrated circuit embodying the graphics processing system, the primitive block generator or the cache.

There may be provided an integrated circuit manufacturing system comprising: a non-transitory computer readable storage medium having stored thereon a computer readable description of a graphics processing system, primitive block generator or cache described herein; a layout processing system configured to process the computer readable description so as to generate a circuit layout description of an integrated circuit embodying the graphics processing system, the primitive block generator or the cache; and an integrated circuit generation system configured to manufacture the graphics processing system, the primitive block generator or the cache according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
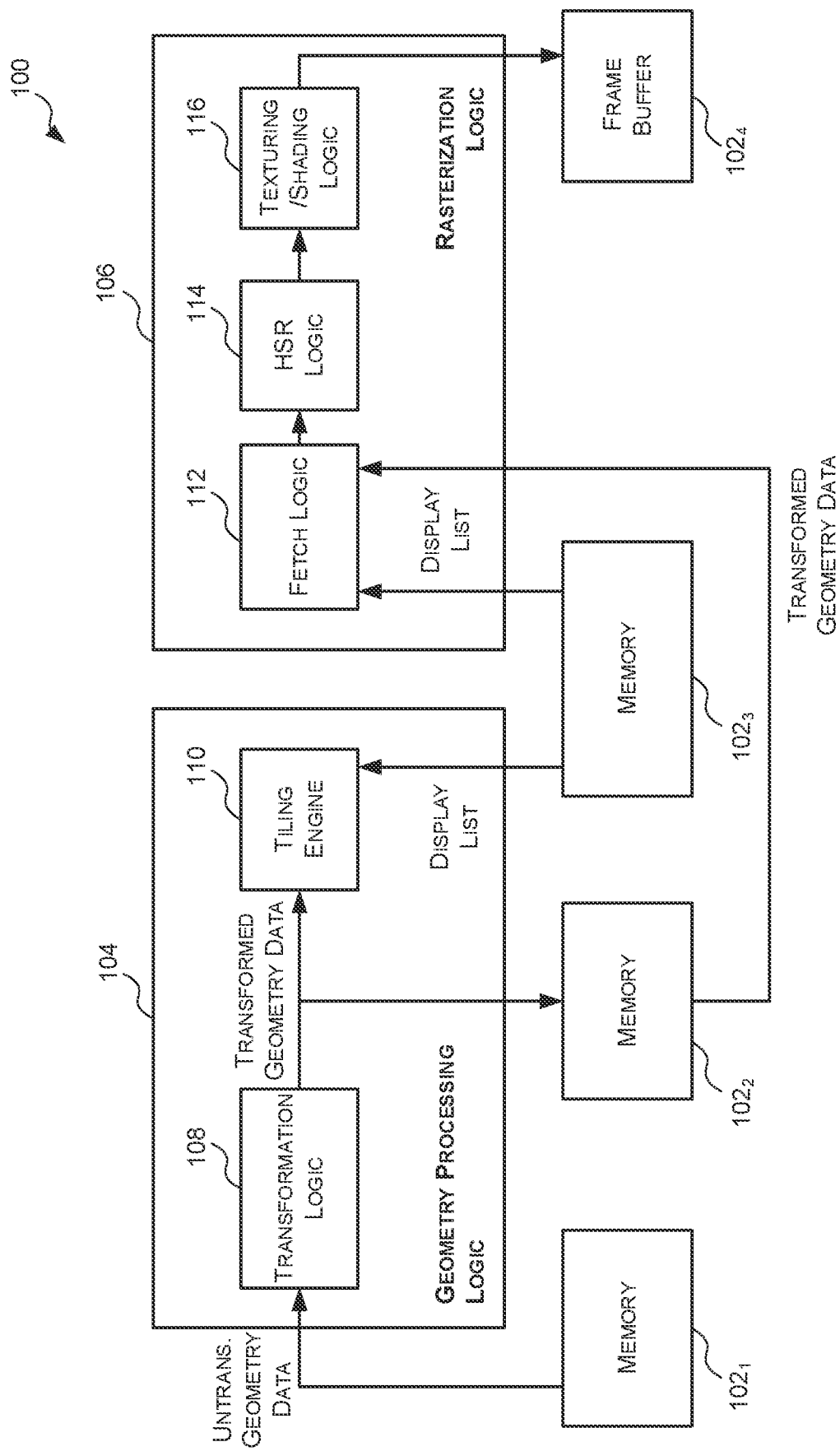
FIG. 1 is a block diagram of a known tile-based rendering graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Figure 2:
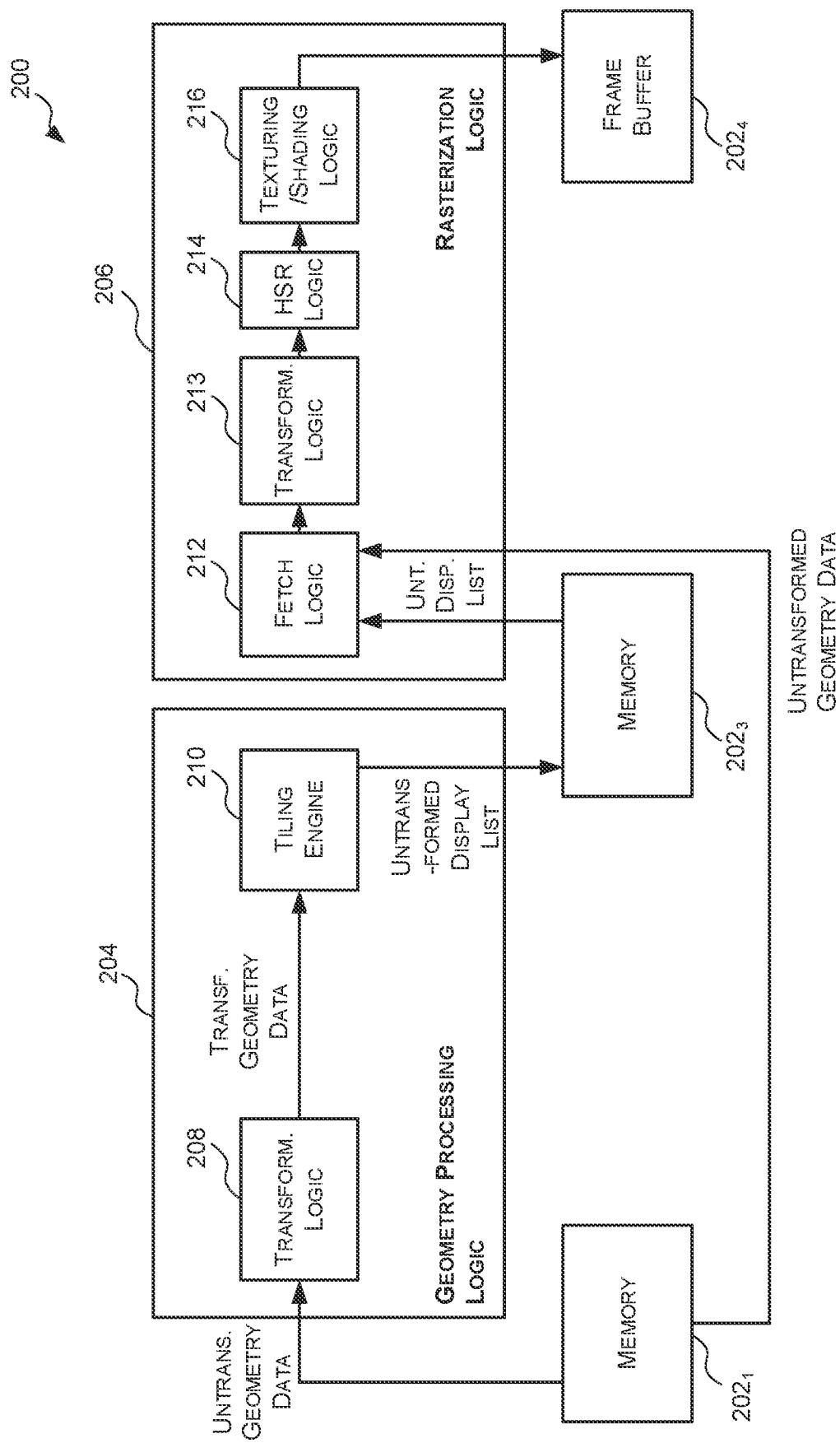
FIG. 2 is a block diagram of a known untransformed display list graphics processing system.

As described above, untransformed display list (UDL) graphics processing systems, such as the graphics processing system 200 of FIG. 2, do not store the transformed geometry data generated in the geometry processing phase, but instead generate display lists for each tile which refer to untransformed primitives and then the untransformed geometry data corresponding to the untransformed primitives identified in each display list is transformed again in the rasterization phase. Such systems eliminate the need for memory for storing transformed geometry data generated in the geometry processing phase and avoid the delay in storing and retrieving the transformed geometry data from memory. These memory-based benefits can provide a significant improvement in the performance of a TBR graphics processing system, especially when used to render scenes for complex games.

In the UDL graphics processing system 200 of FIG. 2 the rasterization logic 206 is configured to fetch and render the primitives related to a particular tile on a primitive basis Specifically, the rasterization logic 206 (e.g. the fetch logic 212 and the transformation logic 213) is configured to, for each primitive identified in the untransformed display list for the tile, fetch the untransformed geometry data for that primitive (e.g. the untransformed geometry data for each vertex forming the primitive) from memory 202, and then transform the fetched geometry data. However, primitives often fall within more than one tile which would require fetching and transforming the same primitive multiple times. So a cache system may be used to cache the results of the fetches and/or transformations. However, the geometry transformation may contain multiple stages such as, but not limited to, clipping, vertex shading, geometry shading, hull shading, and domain shading for tessellation, and to cache the results from each geometry transform stage for the primitives (e.g. vertices) used in a tile would require a complex cache system, such as, that described in UK Published Patent Application No. GB2542133.

Furthermore, in some cases the transformation logic 213 of the rasterization logic 206 may be implemented using one or more SIMD (single instruction multiple data) processors as the transformation logic typically applies the same transformations (e.g. same shaders) to multiple vertices. As is known to those of skill in the art, a SIMD processor comprises multiple processing elements that each perform the same operation on a different set of data. Each processing element that processes a set of input data is referred to as a "lane" of the SIMD processor. A SIMD processor operates most efficiently when each lane is "full" (i.e. is processing data). In some cases, the SIMD processors of the transformation logic 213 may comprise 32 lanes. Fetching and processing the primitives of a tile on a per primitive basis may often result in the SIMD lanes of the transformation logic 213 not being full and/or it may take time to obtain and put together the data for the SIMD lanes.

The inventors have identified that the geometry data transformation in the rasterization phase can be performed efficiently, without a complex cache system, by transforming not only the untransformed primitives that, when transformed, fall within a tile but also untransformed primitives that, when transformed, are near the primitives of the tile. Not only does this allow the SIMD lanes of the transformation logic 213 to be filled (or substantially filled), but if the extra untransformed primitives are near the primitives in a tile it is likely that the transformed geometry data related thereto will be needed by one of the next few tiles that are to be rasterized. Accordingly, the transformed geometry data for the extra untransformed primitives can be stored in a simple cache on the basis that they will likely be used in rasterizing one of the next few tiles that is processed.

Accordingly, described herein are untransformed display list (UDL) graphics processing systems in which the geometry processing logic is configured to group untransformed primitives into untransformed primitive blocks based on the corresponding transformed geometry data; and the rasterization logic is configured to, when a particular untransformed primitive is identified in an untransformed display list, fetch and transform the untransformed geometry data for each of the untransformed primitives in the same untransformed primitive block as the relevant untransformed primitive and cache the transformed geometry data related thereto in a cache system. If it is presumed that the primitives received from the application tend to be spatially grouped (e.g. received in substantially spatial location order) then grouping the untransformed primitives into untransformed primitive blocks may simply comprise grouping the untransformed primitives based on the order in which they are received. However, a more sophisticated mechanism for grouping the untransformed primitives into untransformed primitive blocks may further improve the efficiency of the graphics processing system. Transforming all the untransformed primitives in the same untransformed primitive block as an untransformed primitive referred to in a display list may be referred to herein as primitive block-based transformations. A UDL graphics processing system that implements primitive-blocked based transformations has the memory-based advantages of UDL (no requirement for memory for storing transformed geometry data generated in the geometry processing phase and no delay in storing and retrieving the transformed geometry data to/from memory) without requiring a complex cache system.

Figure 3:
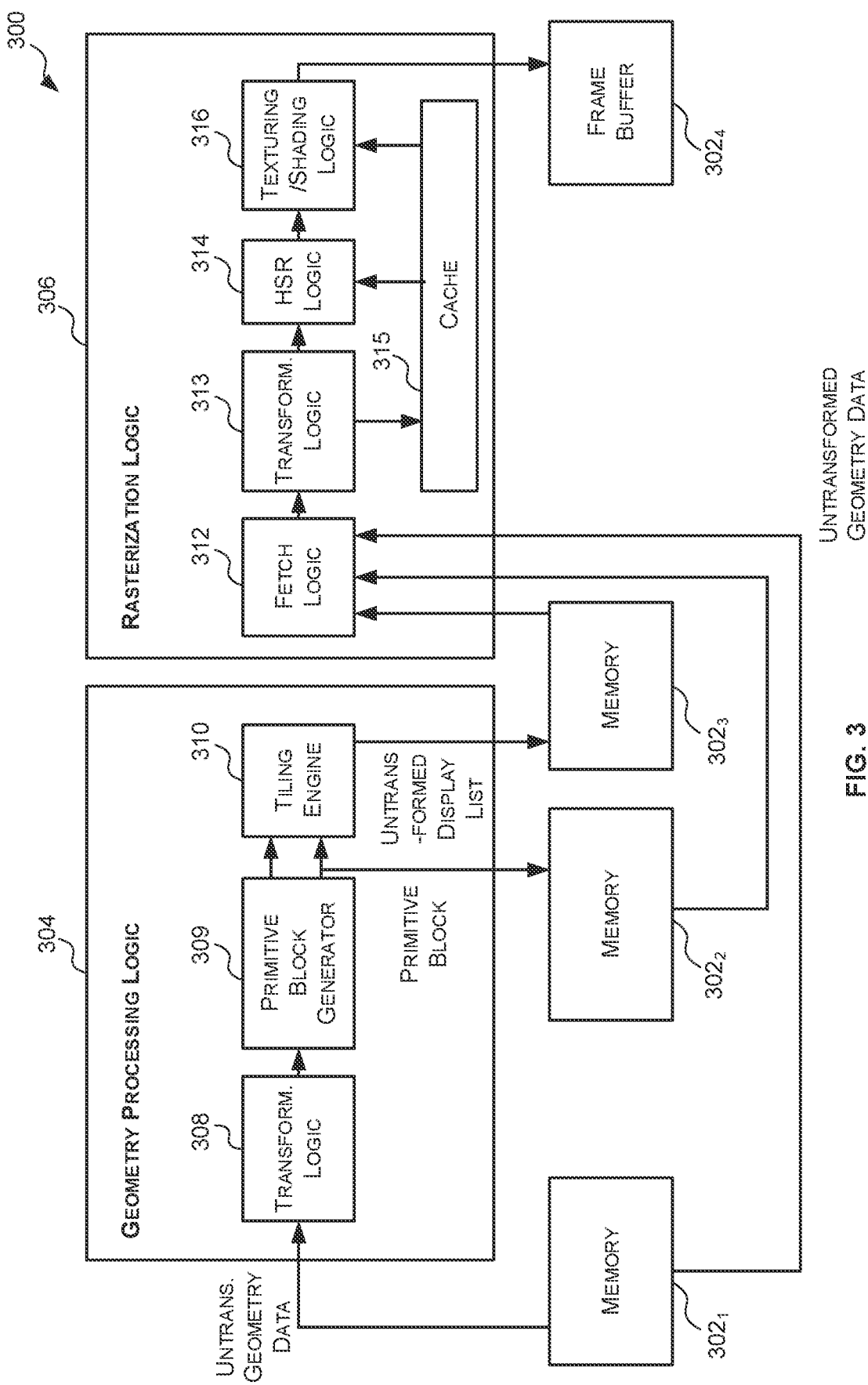
FIG. 3 is a block diagram of a primitive-block based untransformed display list graphics processing system.

Reference is now made to FIG. 3 which shows an example untransformed display list (UDL) graphics processing system 300 which implements primitive-block based transformation in the rasterization phase. The system 300 of FIG. 3 is similar to the system 200 of FIG. 2 in that it comprises memory $302_1$, $302_3$, $302_4$, geometry processing logic 304 and rasterization logic 306. However, in contrast to the system 200 of FIG. 2, the geometry processing logic 304 of FIG. 3 is configured to group the untransformed primitives into untransformed primitive blocks based on the corresponding transformed geometry data and store the untransformed primitive blocks in memory $302_2$; and the rasterization logic 306 is configured to, when an untransformed display list refers to a particular untransformed primitive, fetch and transform the untransformed geometry data for each of the untransformed primitives in the same untransformed primitive block as that untransformed primitive and store the transformed geometry data in a cache.

The memory $302_1, 302_2, 302_3, 302_4$ may be implemented as one or more blocks of memory. The memory $302_1, 302_2, 302_3, 302_4$ may be situated "off-chip" (i.e. not on the same chip as the geometry processing logic 304 and rasterization logic 306). The geometry processing logic 304 and the rasterization logic 306 may communicate with the memory $302_1, 302_2, 302_3, 302_4$ via one or more communication buses as is known in the art.

As described above, an application generates geometry data describing objects in a scene to be rendered which is stored in the memory $302_1$. The geometry data generated by the application is referred to herein as the untransformed geometry data. The untransformed geometry data may comprise vertex data, primitive data and/or patch data. The vertex data may comprise position data for the vertices (e.g. X, Y and Z coordinates in world space which describe the position of the vertex). The vertex data may also comprise a set of attributes to describe the appearance of the vertex, such as texture coordinates (U, V) and/or a base colour to apply to the vertex. In some cases, the vertex data may be stored in a vertex buffer of the memory $302_1$. The primitive data may comprise information which indicates which vertices form each primitive. For example, where the primitives are triangles the primitive data may indicate which three vertices form that primitive. In some cases, the information in the primitive data that identifies a particular vertex may be an index or pointer to a particular portion of the vertex buffer that relates to that vertex. For example, if the vertices are numbered from 0 to 127 the portion of the vertex buffer that relates to vertex 0 may be identified by index or pointer 0 and the portion of the vertex buffer that relates to vertex 20 may be identified by index or pointer 20. In some cases, the primitive data may be stored in an index buffer. The patch data comprises control points which define a patch to be tessellated into primitives for rendering.

The geometry processing logic 304, like the geometry processing logic 204 shown in FIG. 2, implements the geometry processing phase of TBR. The geometry processing logic 304 shown in FIG. 3 comprises transformation logic 308, a primitive block generator 309, and a tiling engine 310. The transformation logic 308 receives untransformed geometry data for a plurality of untransformed primitives and generates transformed position data in the rendering space (e.g. screen space) for each of those untransformed primitives. As described above, the untransformed geometry data for an untransformed primitive comprises position data which indicates the position of the untransformed primitive in world space. In some cases, generating transformed position data for an untransformed primitive may comprise transforming the position data from world space to rendering space. However, in other cases, generating transformed position data may comprise first generating one or more sub-primitives from the original untransformed primitives (e.g. by performing tessellation and/or geometry shading on the untransformed primitives) and transforming the position data for the sub-primitives into rendering space.

Where the primitives are triangles defined by three vertices, the position data for an untransformed primitive (or sub-primitive) may comprise position data (e.g. X, Y, Z coordinates) for each of the three vertices forming that primitive. In these cases, transforming the position data for an untransformed primitive (or sub-primitive) may comprise transforming the coordinates of the vertices forming that primitive (or sub-primitive) into rendering space (e.g. screen space). The transformation logic 208 may also perform functions such as clipping and culling to remove primitives that fall outside of a viewing frustum.

The primitive block generator 309 divides the plurality of untransformed primitives into groups based on the transformed position data therefor, and generates a primitive block for each group which identifies the portion of the untransformed geometry data related to those untransformed primitives. For example, the primitive block generator 309 may receive the transformed position data for the plurality of untransformed primitives and divide the untransformed primitives into groups so that untransformed primitives that have similar transformed positions (e.g. similar positions in the rendering space) are in the same group; and generate an untransformed primitive block for each group wherein each untransformed primitive block identifies the untransformed geometry data stored in memory $302_1$ related to those untransformed primitives. The primitive block generator 309 may use any suitable criteria for determining how to group the untransformed primitives based on their transformed position data. Preferably the untransformed primitives are grouped such that untransformed primitives with spatially similar positions in the rendering space are grouped together. In some examples, the untransformed primitives are grouped into untransformed primitive blocks in the order in which they arrive at the primitive block generator 309. Example implementations of, and methods which may be implemented by, a primitive block generator 309 are described below with reference to FIGS. 6 to 10.

Figure 4:
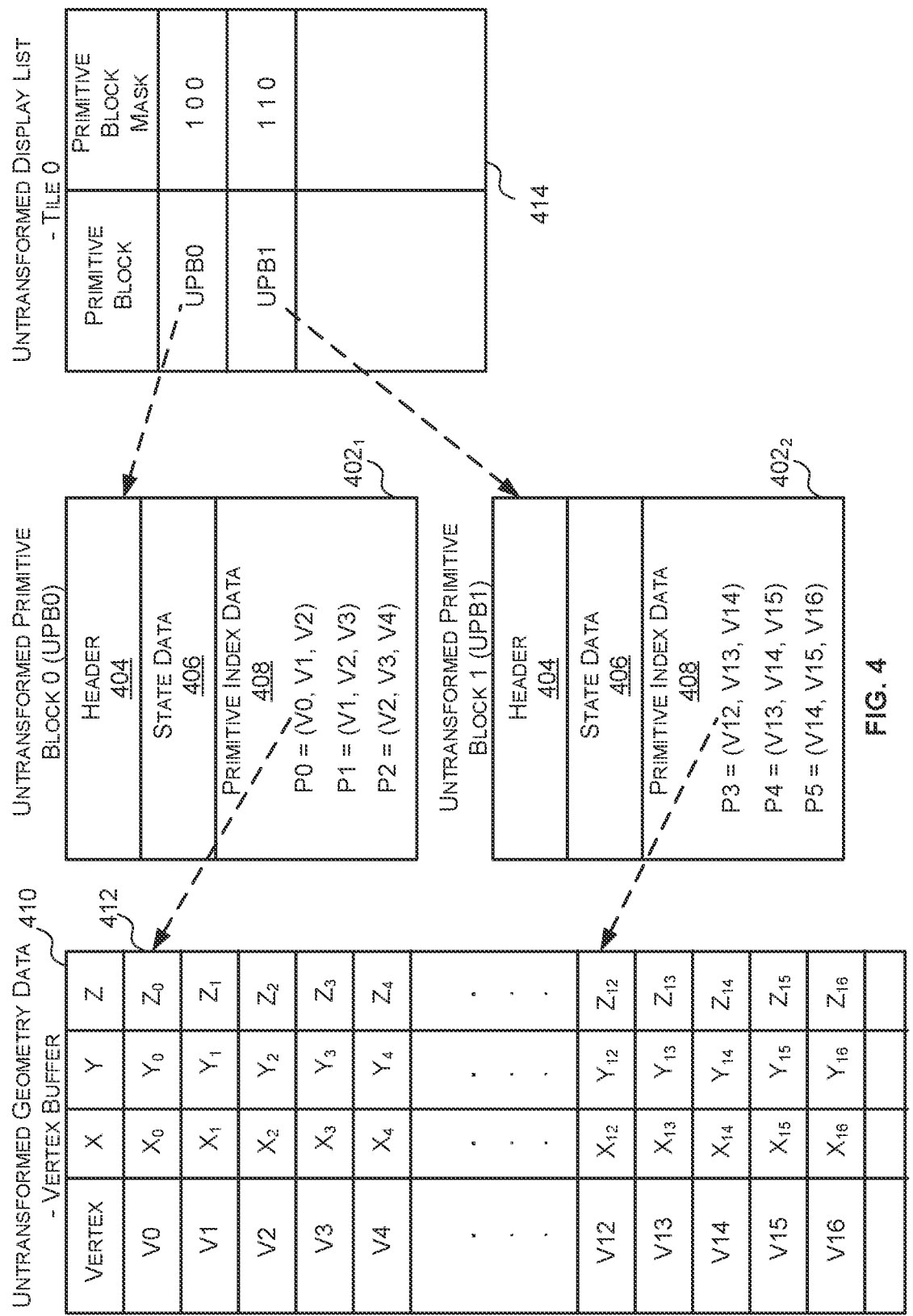
FIG. 4 is a schematic diagram illustrating examples of untransformed display lists, primitive blocks and untransformed geometry data.

An untransformed primitive block is a data construct for linking a group or set of untransformed primitives. FIG. 4 shows examples of untransformed primitive blocks $402_1$, $402_2$. The example untransformed primitive blocks $402_1$, $402_2$ of FIG. 4 include a header 404, state data 406, and primitive index data 408. The header 404 includes information that describes the untransformed primitive block. For example, the header 404 may include, but is not limited to, the number of vertices referred to in the untransformed primitive block and/or the number of primitives referred to in the untransformed primitive block. The state data 406 includes information that describes how the untransformed primitives in the untransformed primitive block $402_1$ or $402_2$ are to be rendered by the rendering logic. The state data can be described as identifying the recipe for rendering the primitives described in the untransformed primitive block. For example, the state data may include, but is not limited to, information identifying a depth compare mode, a blending state, a texture state, and/or a primitive type. The primitive index data 408 comprises a set of indices for each untransformed primitive that identify the vertices that form that untransformed primitive. For example, where the primitives are triangles the primitive index data 408 may comprise a set of three indices which identify the three vertices that form the triangle. The indices are the indices of the vertices sent from the application (which may be referred to herein as the global indices). Each index acts as a pointer to the portion of the untransformed geometry data 410 stored in memory $302_1$ that defines, or relates to, a particular vertex.

For example, as shown in FIG. 4 the primitive index data 408 for the first untransformed primitive block $402_1$ comprises three untransformed primitives—P0, P1 and P2—and each untransformed primitive is formed by three vertices. Specifically, the first untransformed primitive P0 is formed by vertices V0, V1 and V2, the second untransformed primitive P1 is formed by vertices V1, V2 and V3, and the third untransformed primitive P2 is formed by vertices V2, V3, V4. Each vertex index or identifier acts as a pointer to the portion of the untransformed geometry data 410 (e.g. the portion of a vertex buffer) that defines, or is related to, a particular vertex. For example, the identification of vertex 0 (V0) acts as a pointer to the portion 412 of the untransformed geometry data 410 that defines, or relates to, vertex 0 (V0). As described above, the untransformed geometry data for a particular vertex may comprise position data (e.g. a set of coordinates in world space, such as X, Y and Z coordinates) that describes the position of the vertex in world space. The untransformed geometry data for a particular vertex may also comprise a set of attributes to describe the appearance of the vertex, such as texture coordinates (U, V) and/or a base colour to apply to the vertex. In some cases, the primitive index data may be generated by copying, or writing out, the portion of the index buffer that relates to the relevant untransformed primitives. The primitive index data 408 in an untransformed primitive block may be compressed according to any suitable compression technique.

In some cases, the state data may be large (e.g. 5 double words or greater) even though there are only a few possible combinations of state data. For example, the state data may comprise information that identifies the state of a plurality of parameters wherein each parameter is defined by a plurality of bits. In these cases, instead of explicitly including the information for each parameter, each possible combination of state data may be stored in memory in a state data table and the state data 406 portion of an untransformed primitive block may only comprise an index or pointer to one of the entries of the state data table.

Returning to FIG. 3, the untransformed primitive blocks that are generated by the primitive block generator 309 are stored in memory $302_2$ whilst the transformed position data for the untransformed primitives along with information indicating which untransformed primitive block each of the untransformed primitive belongs to is provided to the tiling engine 310. The tiling engine 310 determines, from the transformed position data which untransformed primitives, when transformed, fall, at least partially, within the bounds of each tile. The tiling engine 310 then generates for each tile, an untransformed display list, which indicates which untransformed primitives, when transformed, lie, at least partially, within the bounds of that tile and what untransformed primitive block each of those untransformed primitives is in.

In some cases, the untransformed display list for a tile may comprise information identifying the untransformed primitive blocks that contain the relevant untransformed primitives and a primitive mask for each identified untransformed primitive block that identifies which untransformed primitives within that untransformed primitive block, when transformed, lie, at least partially, within the bounds of that tile. The information identifying a particular untransformed primitive block may be the address of the untransformed primitive block in memory or any other suitable identifier that uniquely identifies the untransformed primitive block. The primitive mask may comprise, for example, a bit for each untransformed primitive (or each possible untransformed primitive) in the untransformed primitive block and may be set to one value (e.g. a "1") when that untransformed primitive is in the tile and set to another value (e.g. "0") when the untransformed primitive is not in the tile. For example, if each untransformed primitive block can comprise a maximum of 32 untransformed primitives then each primitive mask may comprise 32 bits.

An example untransformed display list 414 for a tile is shown in FIG. 4. In this example, there are six untransformed primitives numbered 0 to 5 (P0, P1, P2, P3, P4, P5) and untransformed primitives 0 to 2 (P0, P1, P2) are in untransformed primitive block 0 (UPB0) and untransformed primitives 3 to 5 (P3, P4, P5) are in untransformed primitive block 1 (UPB1). If the tiling engine 310 determines, from the transformed position data for these untransformed primitives, that untransformed primitives 0, 3 and 4, when transformed, fall within a particular tile (e.g. tile 0) then the tiling engine 310 may generate the untransformed display list 414 shown in FIG. 4. Specifically, the tiling engine 310 may generate an untransformed display list 414 that comprises (i) information identifying untransformed primitive blocks 0 and 1 as containing untransformed primitives that, when transformed, at least partially, fall within the bounds of tile 0; and (ii) a primitive mask (e.g. "100") for untransformed primitive block 0 that indicates that the first untransformed primitive (e.g. primitive 0) of that untransformed primitive block, when transformed, at least partially falls within the bounds of tile 0; and (iii) a primitive mask (e.g. "110") for untransformed primitive block 1 (UPB1) that indicates that the first and second untransformed primitives (e.g. primitives 3 and 4) of that untransformed primitive block, when transformed, at least partially, fall within the bounds of tile 1.

Each untransformed display list generated by the tiling engine 310 is stored in memory $302_3$.

The rasterization logic 306 of FIG. 3, like the rasterization logic 206 of FIG. 2, implements the rasterization phase of TBR. Specifically, the rasterization logic 306 renders the primitives in a tile-by-tile manner by fetching the untransformed display list for the tile and fetching the untransformed geometry data for the untransformed primitives that, when transformed, fall, at least partially, within a tile as indicated by the untransformed display list for that tile; transforming the untransformed geometry data for that tile; and rendering the primitives for that tile based on the transformed geometry data. However, unlike the rasterization logic 206 of FIG. 2, instead of fetching and transforming only the untransformed geometry data for the untransformed primitives that, when transformed, fall, at least partially, within a particular tile, the rasterization logic 306 of FIG. 3, fetches and transforms all the untransformed geometry data for any untransformed primitive block identified in the untransformed display list for that tile. This can be described as primitive block-based rasterization. In other words, the rasterization logic 306 fetches and transforms the untransformed geometry data for any untransformed primitive that is in the same untransformed primitive block as an untransformed primitive that falls, when transformed, at least partially, within the bounds of that tile. Once transformed geometry data for an untransformed primitive block has been generated it is stored in a cache (e.g. as a transformed primitive block) for use in rendering the tile that caused its generation, and potentially for use in rendering one or more subsequent tiles.

As shown in FIG. 3 the rasterization logic 306 may comprise fetch logic 312, transformation logic 313, a cache 315, hidden surface removal (HSR) logic 314, and texturing/shading logic 316. When the rasterization logic 306 wants to (or is ready to) process a particular tile the fetch logic 312 fetches the untransformed display list for that tile from memory $302_3$. The fetch logic 312 then determines whether the cache 315 comprises transformed geometry data for all of the untransformed primitive blocks referred to in the untransformed display list. For example, if the untransformed display list refers to untransformed primitive block 0 and untransformed primitive block 1 the fetch logic 312 determines whether the cache 315 comprises transformed geometry data for both untransformed primitive block 0 and untransformed primitive block 1. If the cache 315 does not comprise transformed geometry data for at least one of the untransformed primitive blocks referred to in the untransformed display list for that tile, then the fetch logic 312 fetches the untransformed geometry data for those uncached untransformed primitive blocks.

Fetching the untransformed geometry data for an untransformed primitive block may comprise fetching the untransformed primitive block from memory $302_2$ and using the information therein that identifies the untransformed geometry data related thereto (e.g. the information identifying the vertices which form the untransformed primitives of the untransformed primitive block) to fetch the relevant untransformed geometry data from the memory $302_1$. Any untransformed geometry data fetched from memory $302_1$ is provided to the transformation logic 313 which transforms the untransformed geometry data (e.g. primitives) to generate transformed geometry data. Transforming the untransformed geometry data for an untransformed primitive comprises at least generating transformed position data in rendering space (e.g. screen space) for that untransformed primitive. Transforming the untransformed geometry data may also comprise performing functions such as clipping and culling to clip or remove primitives that fall partially or fully outside of a viewing frustum and/or performing lighting/attribute processing on the primitives. Any transformed geometry data generated by the transformation logic 313 is stored in the cache 315.

Once transformed geometry data for an untransformed primitive block identified in the display list for a tile is stored in the cache 315 and the fetch logic 312 and/or the transformation logic 313 notify the HSR logic 314 that the HSR logic 314 can begin processing the tile and which primitives in that primitive block form the tile. The HSR logic 314 removes primitive fragments which are hidden (e.g. hidden by other primitive fragments). Methods of performing hidden surface removal are known in the art. The remaining fragments (after hidden surface removal) are then passed to the texturing/shading logic 316 which performs texturing and/or shading on the primitive fragments to determine pixel values of a rendered image which can be passed to the memory for storage in a frame buffer. Although not shown in FIG. 3, the texturing/shading logic 316 may receive texture data from a memory in order to apply texturing to the primitive fragments, as is known to those of skill in the art. The texturing/shading logic 316 may apply further processing to the primitive fragments (e.g. alpha blending and other processes), as is known to those of skill in the art in order to determine rendered pixel values of an image.

Figure 5:
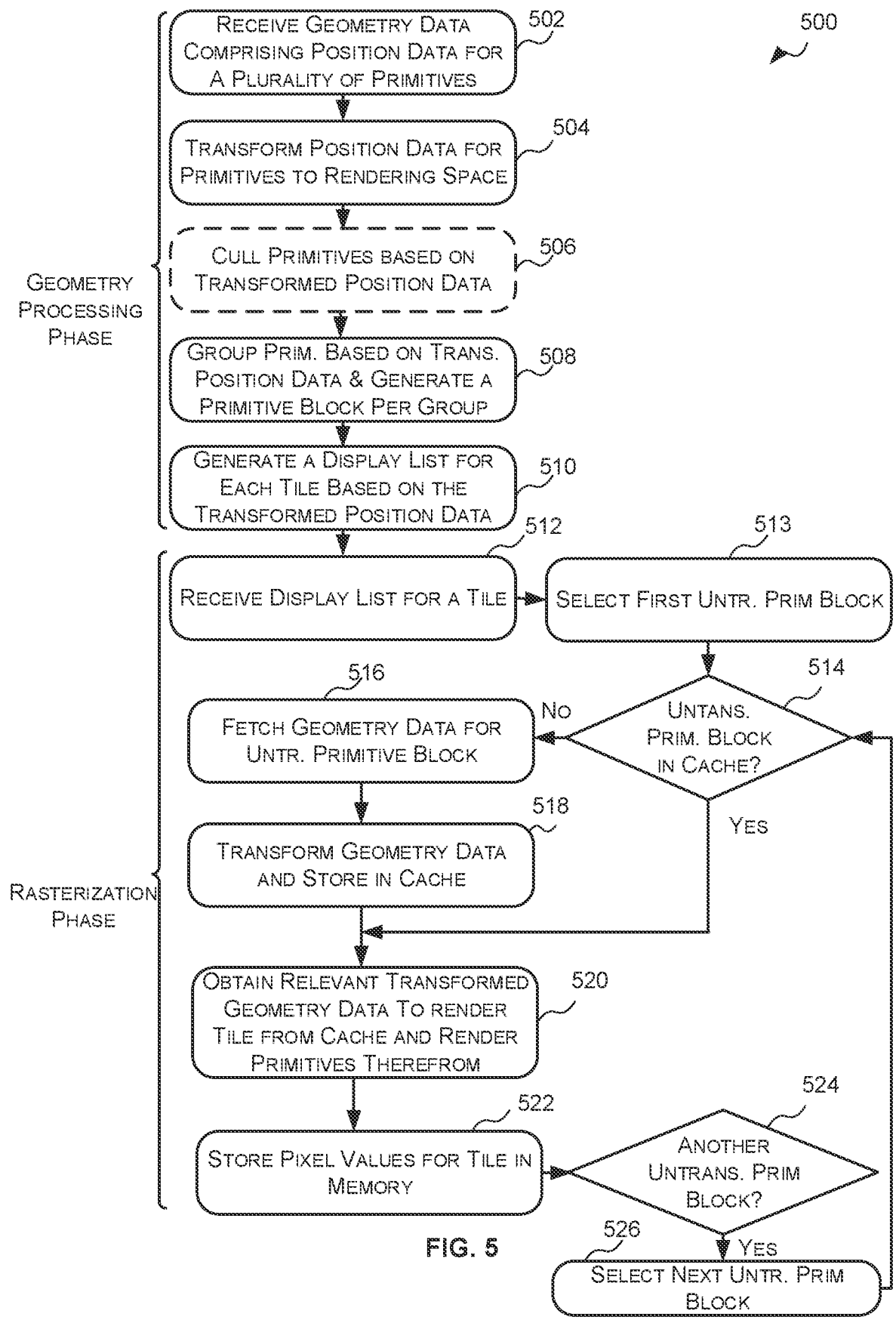
FIG. 5 is a flow diagram of an example method for rendering data in the graphics processing system of FIG. 3.

Reference is now made to FIG. 5 which illustrates an example method 500, which may be implemented by a UDL graphics processing system, such as the UDL graphics processing system 300 of FIG. 3, for rendering a scene from untransformed geometry data received from an application. The method 500 can be divided into a geometry processing phase (blocks 502-510) and a rasterization phase (blocks 512 to 526). The method 500 begins in the geometry processing phase at block 502 where untransformed geometry data describing objects in a scene to be rendered is received. The untransformed geometry data comprises position data for each of a plurality of untransformed primitives. As described above, each untransformed primitive may be defined by one or more vertices and the untransformed geometry data for an untransformed primitive may comprise vertex data (e.g. X, Y and Z coordinates) that describes the position of one or more vertices in world space, and primitive data which describes which vertices form that primitive.

At block 504, transformed position data for each of the plurality of untransformed primitives is generated. As described above, in some cases, generating transformed position data for an untransformed primitive may comprise transforming the position data for the untransformed primitive from world space to the rendering space (e.g. screen space). In other cases, generating transformed position data for an untransformed primitive may comprise generating one or more sub-primitives from the untransformed primitive and transforming the position data for the sub-primitives from world space to rendering space (e.g. screen space). Transforming the position data for an untransformed primitive or sub-primitive may involve transforming the position of the vertices (e.g. X, Y, Z coordinates) forming the primitive or sub-primitive from world space to rendering space (e.g. screen space). The process of transforming the position of a vertex (e.g. X, Y, Z coordinates) from world space to rendering space (e.g. screen space) may be referred to as a viewport transformation. Methods are known to a person of skill in the art for performing viewport transformations. Once the transformed position data for the untransformed primitives has been generated the method 500 may proceed to block 506 or the method 500 may proceed directly to block 508.

At block 506, which is optional, the untransformed primitives are clipped or culled (by, for example, the transformation logic 308 or a culling module) based on the transformed position data to remove any redundant primitives so as to reduce the workload in the remaining blocks of the method. There are many different methods that can be used to identify that an untransformed primitive is redundant and therefore can be removed. Redundant primitives may be identified using any suitable method or combination of methods. For example, in some cases, an untransformed primitive may be deemed to be redundant, if according to the transformed position data it: is facing away from the user; is completely off the screen; is fully outside the clipping planes; has a bounding box that does not cover any sample points; and/or does not cover any sample points. Once the untransformed primitives have been culled based on the transformed position data the method 500 proceeds to block 508.

At block 508, after transformed position data has been generated for the untransformed primitives (and optionally after the primitives have been culled) the untransformed primitives are sorted into groups based on the transformed position data and an untransformed primitive block is generated for each group. As described above, each untransformed primitive block includes information identifying the untransformed primitives that form that untransformed primitive block and information that indicates the portion of the geometry data that relates to each of those untransformed primitives. For example, as shown in FIG. 4 each untransformed primitive block may comprise a primitive index section that identifies, for each untransformed primitive in the primitive block, which vertices form that primitive. In some cases, the information identifying a vertex may be an index into the vertex buffer which can be used to obtain the geometry data relating to that vertex from the vertex buffer. The untransformed primitive block may also include other information which may aid in processing the primitive blocks in the rasterization phase such as information indicating how the untransformed primitives in the block are to be rasterized.

The untransformed primitives are preferably grouped so that untransformed primitives in the same untransformed primitive block are, when transformed, spatially close (i.e. have spatially similar positions) in the rendering space (e.g. screen space). Where it is expected that the untransformed primitives will be received or processed in an order where spatially similar primitives are received or processed close together the untransformed primitives may simply be grouped based on the order in which they are received or processed (e.g. in the submission order in which the untransformed primitives are received from an application). For example, every K untransformed primitives may be grouped to form an untransformed primitive block wherein K is an integer greater than 2. However, more sophisticated methods for grouping the untransformed primitives based on the transformed position data may improve the efficiency in the rasterization phase. Example methods and primitive block generators for grouping the untransformed primitives based on the transformed position data are described below with respect to FIGS. 6 to 10. Once the untransformed primitives have been grouped into untransformed primitive blocks the method 500 proceeds to block 510.

At block 510, for each tile, the untransformed primitives that, when transformed, fall, at least partially, within the bounds of the tile are determined from the transformed position data for the untransformed primitives and an untransformed display list is generated for the tile that identifies the untransformed primitives that, when transformed, fall, at least partially, within the tile and the untransformed primitive block to which they belong. Methods for determining which untransformed primitives fall, when transformed, at least partially within the bounds of a tile, are known to persons of skill in the art. As described above, each untransformed display list may comprise information identifying which untransformed primitive blocks comprise untransformed primitives that, when transformed, fall within the corresponding tile and for each identified untransformed primitive block, information identifying which of the untransformed primitives in that block fall, when transformed, at least partially, within the bounds of the tile. The information identifying an untransformed primitive block may be the address of the untransformed primitive block in memory or any other suitable identifier that uniquely identifies the untransformed primitive block. The information identifying which untransformed primitives in an untransformed primitive block, when transformed, fall, at least partially, within the bounds of the tile may be a primitive mask. The primitive mask may comprise a bit for each untransformed primitive that is in the untransformed primitive block and the bit may be set to one value (e.g. "1") when the corresponding untransformed primitive is, when transformed, in the tile and set to another value (e.g. "0") when the corresponding untransformed primitive is, when transformed, not in the tile. Once the untransformed display lists have been generated the method 500 proceeds to block 512 where the rasterization phase begins.

At block 512, an untransformed display list for a tile generated in block 510 is received (e.g. at the rasterization logic 306 or the fetch logic 312 from the memory $302_3$). Once a display list is received the method 500 proceeds to block 513. At block 513, the first untransformed primitive block identified in the untransformed display is selected and the method 500 proceeds to block 514.

At block 514, a determination is made whether there is transformed geometry data in the cache for the selected untransformed primitive block. As will be described in more detail in block 518, after untransformed geometry data for an untransformed primitive block (i.e. the untransformed geometry data related to the untransformed primitives in the untransformed primitive block) is transformed in the rasterization phase the transformed geometry data for the untransformed primitive block is temporarily stored in a cache. If transformed geometry data for the selected untransformed primitive block is not in the cache, then the method 500 proceeds to block 516. If, however, the cache comprises transformed geometry data for the selected untransformed primitive block then the method 500 proceeds to block 520.

At block 516, the untransformed geometry data for the selected untransformed primitive block is fetched (e.g. by the fetch logic 312) from memory (e.g. memory $302_1$). The untransformed geometry data for an untransformed primitive block may be fetched from memory based on the information in the untransformed primitive block. For example, as described above, each untransformed primitive block may include information that indicates the vertices that form each of the untransformed primitives in that block. The identified vertices may be used to obtain the geometry data related to those vertices which together forms the untransformed geometry data for the untransformed primitive block. In some cases, the information identifying a vertex may be an index into the vertex buffer which can be used to obtain the untransformed geometry data in the vertex buffer related to that vertex. Once the untransformed geometry data for the selected untransformed primitive block has been fetched the method 500 proceeds to block 518.

At block 518, the untransformed geometry data fetched in block 516 is transformed to generate transformed geometry data and the transformed geometry data is stored in the cache. Transforming untransformed geometry data for an untransformed primitive comprises generating transformed position data for the untransformed primitive in rendering space (e.g. screen space). As described above, in some cases generating transformed position data for an untransformed primitive may comprise transforming the position of the untransformed primitive into a position in the rendering space. In other cases, generating transformed position data for an untransformed primitive may comprise generating one or more sub-primitives from the untransformed primitive (via tessellation or geometry shading) and transforming the position of those sub-primitives into positions in the rendering space. As described above, where the primitives are defined by one or more vertices transforming the position of a primitive (or sub-primitive) into a position in the rendering space may comprise transforming the co-ordinates of the vertices to rendering space (e.g. screen space) co-ordinates. Transforming the geometry data may also comprise performing one or more other operations on the untransformed geometry data such as, but not limited to, clipping or culling the primitives that are not relevant as described above with respect to block 506. Once the untransformed geometry data fetched in block 516 has been transformed and stored in the cache, the method 500 proceeds to block 520.

At block 520, the transformed geometry data for the untransformed primitives identified in the untransformed display list (i.e. those untransformed primitives that are to be used in rendering the tile) is obtained from the cache and is used to render those primitives. As described above, rendering a primitive may comprise performing hidden surface removal to remove fragments of primitives which are hidden in the scene, and/or performing texturing and/or shading on the fragments to determine pixel values of a rendered image. Once the pixel values for the tile have been determined the method 500 proceeds to block 522.

At block 522, the pixel values are passed to memory $302_4$ for storage in a frame buffer. The method 500 then proceeds to block 524 where a determination is made as to whether the untransformed display list identifies another untransformed primitive block. If the untransformed display list identifies another untransformed primitive block, then the method 500 proceeds to block 526 where the next untransformed primitive block identified in the untransformed display list is selected and then blocks 514 to 522 are repeated for that untransformed primitive block.

Blocks 512 to 522 (i.e. the rasterization phase) may be repeated for each untransformed display list (i.e. for each tile) at which point the whole image has been rendered and stored in the memory. At this point the image can be output and, for example, displayed on a display.

Primitive Block Generator

As described above, the primitive block generator 309 is configured to divide the plurality of untransformed primitives into groups based on the transformed position data therefor, and generate an untransformed primitive block for each group which identifies the portion of the untransformed geometry data related to those untransformed primitives. The primitive block generator 309 may use any suitable criteria for determining how to group the untransformed primitives based on their transformed positions. Preferably the untransformed primitives are grouped such that untransformed primitives that, when transformed, are in close proximity, in the rendering space (e.g. screen space), are grouped together. As described above, all the untransformed geometry data related to an untransformed primitive block referred to in an untransformed display list for a tile is fetched and transformed, regardless of whether all, or only a portion of, the untransformed primitives in the untransformed primitive block fall, when transformed, at least partially, within that tile. This transformation can be performed efficiently using SIMD processing units to process different items of geometry data from an untransformed primitive block in parallel. All of the transformed geometry data for the untransformed primitive block is then stored in a cache. Accordingly, if the "extra" untransformed primitives that are fetched and transformed (i.e. the untransformed primitives in the same untransformed primitive block as an untransformed primitive, which when transformed, is in a tile but that do not fall within the tile themselves) are spatially close, when transformed, to the untransformed primitives in the tile the transformed geometry data related thereto is likely to be needed to render one of the nearby tiles (which may be likely to be processed soon) which increases the likelihood that the transformed geometry data related to the "extra" untransformed primitives will still be in the cache when it is needed.

The untransformed primitives (and the untransformed geometry data related thereto) may be provided to the geometry processing logic 304 in a particular order or sequence. In these cases, the transformation logic 308 may be configured to process the untransformed primitives in that order (i.e. transform the position data related thereto) such that the primitive block generator 309 receives the transformed position data related thereto in the same order. It will be evident to a person of skill in the art that the order of the untransformed primitives can affect the way a scene is rendered. For example, if a plurality of overlapping primitives are translucent then the order in which they are processed may affect the way in which the primitives are blended to form the rendered scene. Therefore, in order to maintain the sequence order of the untransformed primitives, the primitive block generator 309 may be configured to group the untransformed primitives based on the order ("submission order") in which they (i.e. the transformed position data related thereto) are received so as to preserve their order. For example, the primitive block generator 309 may be configured to continue to place the received untransformed primitives in the same group until the group is full at which point the primitive block generator creates and outputs an untransformed primitive block for the group of primitives. Any further untransformed primitives received are placed in the next group until that group is full and so on. In this way the order of the untransformed primitives is maintained in the untransformed primitive blocks. A group may be considered "full" if the number of vertices in the group is greater than or equal to a maximum number of vertices (e.g. the maximum number of vertices in a primitive block may be 64 or 128 to give two examples) and/or if the number of primitives in the group is greater than or equal to a maximum number of primitives (e.g. the maximum number of primitives in a primitive block may be 64 or 128, to give two examples). A new group may be started if there is a state change because in examples described herein the primitives that are grouped together into an untransformed primitive block share the same state.

Grouping the untransformed primitives based on the order in which the primitives (i.e. the transformed position data related thereto) are received is simple to implement and works well in the graphics processing system 300 of FIG. 3 in cases where untransformed primitives which are close in order are also spatially close together, when transformed (i.e. in the rendering space (e.g. screen space)). However, in cases where it is possible for untransformed primitives which are close in order to be spatially far apart in rendering space (e.g. screen space) this method of grouping the untransformed primitive may not allow the rasterization logic 306 to operate efficiently. This is because, in these cases, it is likely that such a method will result in untransformed primitive blocks that contain untransformed primitives that, when transformed, are spatially far apart. If an untransformed primitive block comprises untransformed primitives that, when transformed, are spatially far apart the rasterization logic 306 is not likely to use the transformed geometry data related to the "extra" untransformed primitives in an untransformed primitive block before that transformed geometry data is evicted from the cache.

Figure 6:
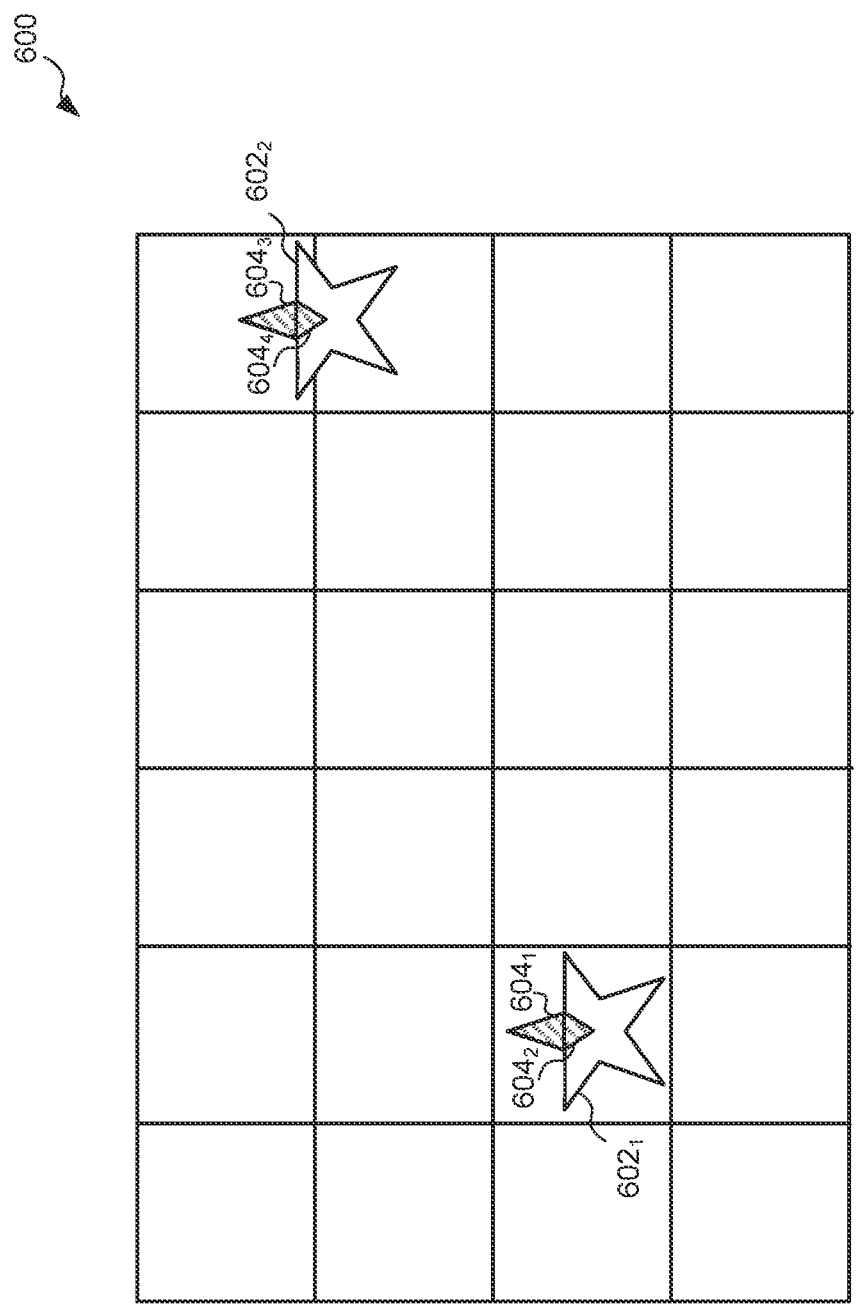
FIG. 6 is a schematic diagram of a plurality of primitives in an example rendering space divided into a plurality of tiles.

For example, FIG. 6 shows a simple example of a scene 600 to be rendered by the graphics processing system 300 of FIG. 3. The scene 600 includes two similar objects $602_1$ and $602_2$ which are spatially separated from each other in the scene 600. As described above, in a TBR graphics processing system the rendering space (e.g. screen space) is divided into a plurality of tiles. In the example shown in FIG. 6 the rendering space (e.g. screen space) is divided into a 4×6 array of rectangular tiles. In other examples, the rendering space (e.g. screen space) may be divided into a different number and/or arrangement of tiles. In one example, each tile comprises 32×32 sample positions, and there may be many tiles (e.g. hundreds of tiles) in the rendering space (e.g. screen space), depending on the size and resolution of the image that is being rendered. In other examples tiles may be non-rectangular (e.g. triangular or hexagonal), or may vary in size according to their position.

FIG. 6 shows two primitives $604_1$, $604_2$ of the first object $602_1$ and two similar primitives $604_3$, $604_4$ of the second object $602_2$. In the example of FIG. 6 the primitives are triangles which may be defined by vertex data at three vertices, but in other examples other types of primitives may be used wherein the primitives may be other shapes such as quadrilaterals or hexagons, or may be lines or points. The primitives may be received at the geometry processing logic 304 in an order that it deems to be suitable, and may for example place similar primitives together in the order such that the primitives $604_1$, $604_2$, are received at the geometry processing logic 304 consecutively. As an example, primitives may be "similar", and therefore placed together in the order if they have a similar state wherein the state is the information that describes how the primitive is to be rendered.

If the untransformed primitives are placed in the order such that "similar" primitives are placed together in the order, then the primitives $604_1$, $604_2$, $604_3$, $604_4$ may be placed together in the order and the other primitives of the first object may be placed further away in the order. This means that if a primitive block generator places the untransformed primitives in primitive blocks based on the order the primitives are received, primitives $604_1$, $604_2$, $604_3$, $604_4$ would likely be placed in the same untransformed primitive block whereas the other primitives of the first object $602_1$ may be placed in one or more different untransformed primitive blocks. This means that when the rasterization logic 306 processes the tile in the first row of the sixth column it will fetch and transform the untransformed geometry data for all the untransformed primitives in the untransformed primitive block that contains the primitives $604_3$, $604_4$ (i.e. it will also fetch and transform the untransformed geometry data for primitives $604_1$, $604_2$). However, since the tile in the third row of the second column is far from the tile in the first row of the sixth column it is unlikely that the transformed geometry data for primitives $604_1$, $604_2$ will still be in the cache when the tile in the third row of the second column is processed by the rasterization logic 306. This would mean that the untransformed geometry data for that untransformed primitive block would have to be fetched and transformed again. Where the process of transforming geometry data includes executing one or more shader programs, such as, but not limited to a vertex shader program; a geometry shader program; hull shader program and a domain shader program, re-transforming the untransformed geometry data for an untransformed primitive may be time and processing resource intensive. Furthermore writing and reading data to and from the memories $302_1$, $302_2$, $302_3$ is a relatively slow process in the processing of untransformed primitives by the graphics processing system 300 of FIG. 3 especially when the memories are "off-chip", i.e. not on the same chip as the geometry processing logic 304 and/or the rasterization logic 306. The rasterization logic 306 may, therefore be able to process the primitives more efficiently if the untransformed primitives are grouped based on their spatial position to increase the likelihood that the transformed geometry data that relates to the "extra" untransformed primitives in an untransformed primitive block (i.e. those untransformed primitives in the untransformed primitive block that, when transformed, do not fall, at least partially, within the tile being processed) will still be in the cache when the tile or tile(s) that the "extra" untransformed primitives relate to are processed.

Accordingly, in other cases the primitive block generator 309 may be configured to group untransformed primitives according to their transformed spatial positions, as set out by the transformed position data. An example method for grouping primitives according to their spatial position is described in UK Published Patent Application No. GB2526598 and is herein incorporated by reference. Specifically, GB2526598 describes a method in which, when a primitive is received at a primitive block generator, the primitive block generator compares the spatial position of the received primitive with the spatial position of one or more 'open' primitive blocks and allocates the received primitive to a primitive block based on the result of the comparison. GB2526598 describes that in one example, a primitive is allocated to a primitive block if the spatial position of the primitive overlaps with, or is a minimum distance from, the spatial position of the primitive block (which is based on the spatial position of the primitives in the primitive block). GB2526598 describes several mechanisms for determining the spatial position of the primitive, the spatial position of the primitive block and the distance between the spatial position of the primitive and the spatial position of the primitive block.

The inventors have identified that the performance and efficiency of the rasterization phase can be further improved if the decision on whether to add a primitive to a primitive block is based both on the distance between the spatial position of the primitive and the spatial position of the primitive block; and how full the primitive block is. This provides a good trade-off between having full primitive blocks (which will fill up the SIMD lanes) and having primitive blocks that have primitives too far apart. Accordingly, described below are primitive block generators that are configured to place a primitive in a primitive block based on (i) the distance between the spatial position of the primitive and the spatial position of the primitive block; and (ii) how full the primitive block is. For example, in some cases, a primitive may be placed in a primitive block if the distance between the spatial position of the primitive and the spatial position of the primitive block is less than a distance threshold wherein the distance threshold is dynamically selected based on how "full" the primitive block is. In some cases, the less full the primitive block the greater the threshold distance and the more full the primitive block the lower the threshold distance.

Figure 7:
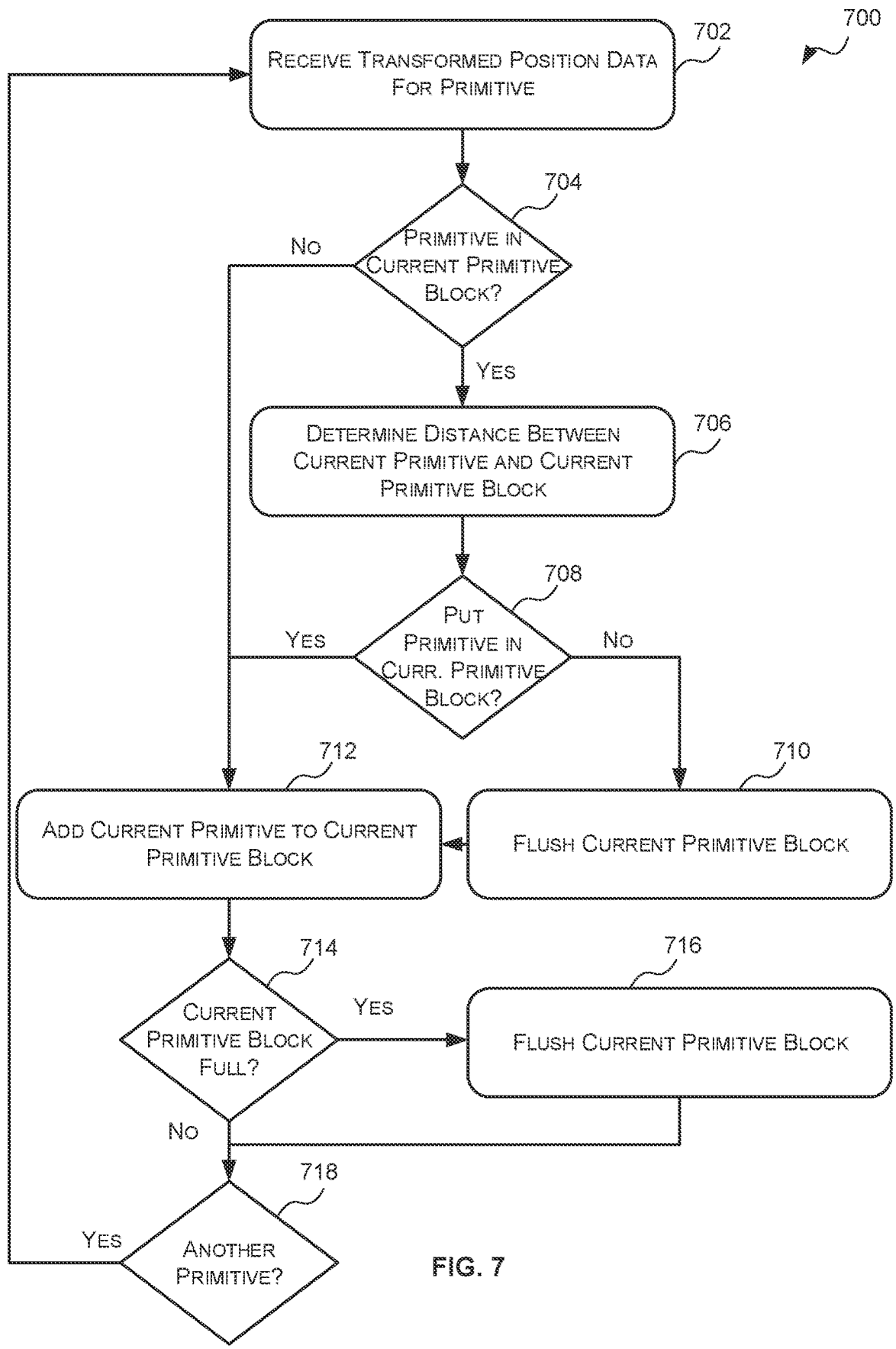
FIG. 7 is a flow diagram of an example method of generating primitive blocks.

Reference is now made to FIG. 7 which illustrates an example method 700 for generating primitive blocks, which may be implemented by the primitive block generator 309 of FIG. 3, wherein the decision on whether to place a primitive in a primitive block is based on the distance between the spatial position of the primitive and the spatial position of the primitive block and how full the primitive block is. The method 700 may be used in a UDL TBR graphics processing system such as the graphics processing system 300 of FIG. 3 to generate untransformed primitive blocks (i.e. primitive blocks that refer to untransformed primitives), or, the method 700 may be used in a non-UDL TBR graphics processing system to generate transformed primitive blocks (i.e. primitive blocks that refer to transformed primitives). As described above, in some cases, an untransformed primitive may be transformed into a plurality of transformed primitives (i.e. a plurality of sub-primitives may be generated therefrom, and the sub-primitives may be transformed into transformed primitives). In these cases, the transformed primitives may be sorted into untransformed primitive blocks on a transformed primitive basis or on an untransformed primitive basis.

Where the transformed primitives are sorted into primitive blocks on an untransformed primitive basis then all the transformed primitives that correspond to a single untransformed primitive are treated as a single primitive for the purposes of making a decision on whether to add the primitive to the primitive block. In these cases, the current primitive is a set of transformed primitives related to an untransformed primitive. In these cases, each untransformed primitive will only be identified in a single untransformed primitive block which may mean that the untransformed primitive block only has to be re-transformed once. However, when each untransformed primitive block is transformed the transformed geometry data related thereto may be stored in a transformed primitive block. If the untransformed primitive spawns many transformed primitives then all of the transformed geometry data related thereto may not be able to be stored in a single transformed primitive block (due to size restrictions) and may have to be stored in a hierarchy of transformed primitive blocks which may make retrieval of the transformed geometry data, more complicated.

In contrast, where the transformed primitives are sorted into primitive blocks on a transformed primitive basis then the decision on whether to add a primitive to a primitive block is based solely on the transformed position data for that transformed primitive. In these cases the current primitive is a single transformed primitive. This means that different transformed primitives that correspond to the same untransformed primitive may be associated with different untransformed primitive blocks. As a result an untransformed primitive may be identified in multiple untransformed primitive blocks. In these cases, additional information may be added to the untransformed primitive block to specify which transformed primitives related to an untransformed primitive identified in the untransformed primitive block is associated with the primitive block. Then when the untransformed primitive block is transformed only the transformed geometry data related to the identified transformed primitives will be stored in the transformed primitive block. This allows the system to know in advance how many transformed primitives will be in the corresponding transformed primitive block, allowing one transformed primitive block per untransformed primitive block. However, it may result in the same untransformed primitive being re-transformed multiple times in the rasterization phase—one for each untransformed primitive block to which it belongs.

The method 700 begins at block 702 where the primitive block generator receives transformed position data for a current primitive. As described above, the current primitive may be a single transformed primitive (i.e. a primitive output by the transformation logic) or a primitive formed by a set of transformed primitives that relate to the same untransformed primitive. Where the current primitive is a single transformed primitive the transformed position data comprises information indicating the position of the primitive in render space (e.g. screen space). Where a primitive is defined by one or more vertices the transformed position data may comprise position data (e.g. X, Y, Z coordinates) for the vertices that form that primitive. Where, however, the current primitive is a primitive formed by the set of transformed primitives that relate to the same untransformed primitive the transformed position data may comprise information indicating the position of each of the one or more transformed primitives in rendering space. However, it will be evident to a person of skill in the art that the position data may comprise other and/or different information. Once the transformed position data for the current primitive has been received the method 700 proceeds to block 704.

At block 704, the primitive block generator determines whether there are any primitives in the current primitive block. In other words, the primitive block generator determines whether the current primitive block is empty. The current primitive block is the primitive block to which new primitives can be added. If the primitive block generator determines that there is at least one primitive in the current primitive block, then the method 700 proceeds to block 706. If, however, the primitive block generator determines that there are no primitives in the current primitive block then the method 700 proceeds directly to block 712.

At block 706, the primitive block generator determines the distance between the spatial position of the current primitive and the spatial position of the current primitive block. The distance is a quantitative metric or set of metrics that indicates how 'close' the current primitive is to the primitives in the current primitive block. The distance may be determined in any suitable manner.

Figure 8:
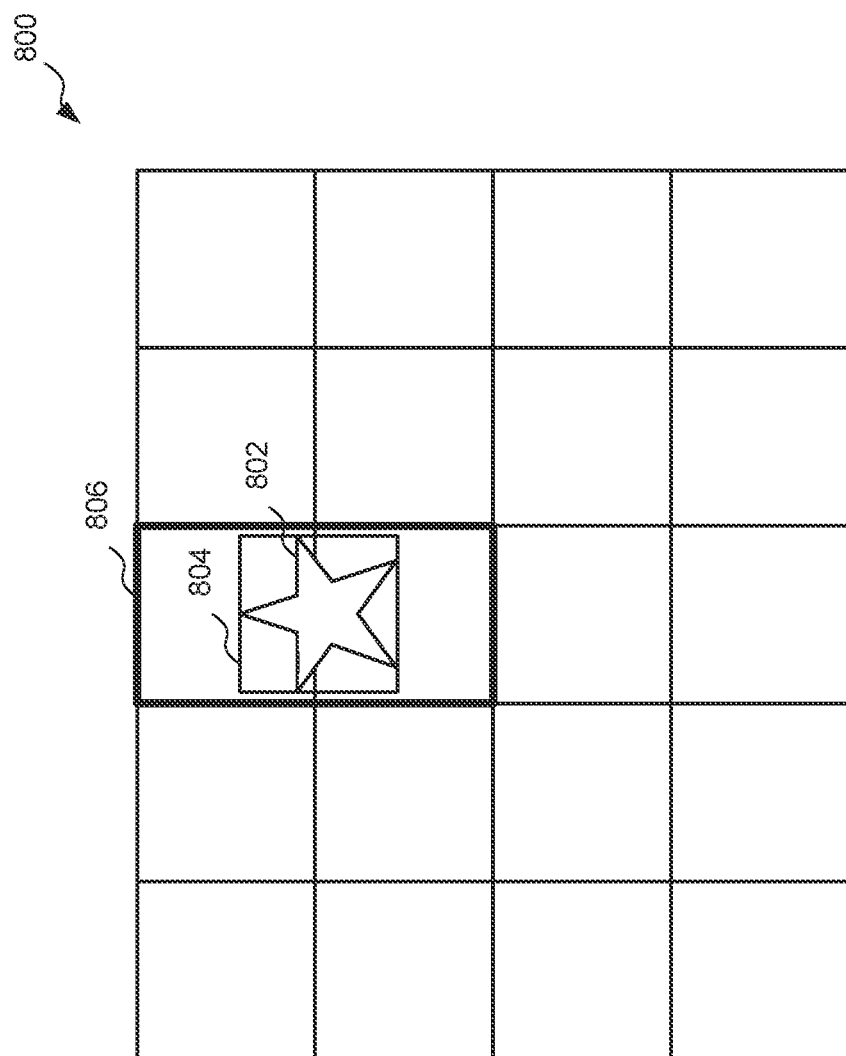
FIG. 8 is a schematic diagram illustrating example bounding boxes for a set of primitives using different granularities.

In some cases, the distance between the spatial position of the current primitive and the spatial position of the current primitive block is determined by the bounding box of the current primitive block without the current primitive (i.e. the bounding box for the primitives in the current primitive block) and the bounding box of the current primitive block with the current primitive (i.e. the bounding box for the primitives in the current primitive block and the current primitive). A "bounding box" for a set of one or more primitives is the minimum or smallest bounding or enclosing box in which all of the primitives lie. The bounding box may be an axis-aligned bounding box. The bounding box may be determined from the maximum and minimum x and y positions of the primitives in the set. Where each primitive is defined by one or more vertices the maximum and minimum x and y positions of the primitives may be the maximum and minimum x and y coordinates respectively of the vertices that form the primitives in the set. In some cases, the resolution of the bounding box may be per sample resolution (i.e. the resolution of the sampling grid) or per tile resolution. For example, FIG. 8 shows an example rendering space 800 divided into a 4×5 matrix of tiles. If the primitives in a set form the object 802 then the bounding box for the primitives if at a per sample resolution may be as shown at 804. In contrast, the bounding box for the primitives if at a per tile resolution may be as shown at 806.

In some cases, the distance between the spatial position of the current primitive and the spatial position of the current primitive block is based on the size of the bounding box of the primitive block without the current primitive and the size of the bounding box of the primitive block with the current primitive in one or more dimensions. For example, in some cases, the distance may be equal to the difference between the size of the bounding box for the primitive block with and without the current primitive in one or more dimensions. In particular, the distance may be equal to the difference in the x dimensions of the bounding boxes; the difference in the y dimensions of the bounding boxes; the difference in the area (e.g. x*y) of the bounding boxes; or a combination of one or more of these differences. For example, the distance may be represented by any combination of the listed difference metrics. For example the distance may be represented by a single difference metric, or multiple difference metrics. For example, in some cases the distance may be represented by a triple (a, b, c) wherein a is the difference in the x dimensions of the bounding boxes, b is the difference in the y dimensions of the bounding boxes, and c is the difference in areas of the bounding boxes.

In other examples, the distance may be equal to the ratio between the size of the bounding boxes for the current primitive block with and without the current primitive in one or more dimensions. For example, the distance may be equal to: the ratio of the x dimensions of the bounding boxes; the ratio of the y dimensions of the bounding boxes; the ratio of the areas (e.g. x*y) of the bounding boxes; or a combination of one or more of these ratios. For example, the distance may be represented by a single ratio metric or multiple ratio metrics. For example, in some cases the distance may be represented by a triple (a, b, c) wherein a is the ratio of the x dimensions of the bounding boxes, b is the ratio of the y dimensions of the bounding boxes, and c is the ratio of the areas of the bounding boxes.

In other examples, the distance may be a combination of distance and ratio metrics.

In other cases, instead of the distance being determined from the bounding boxes of the current primitive block with and without the current primitive, the distance may be determined from the order in which the tiles are rendered. The tile rendering order might not be fixed (e.g. it may be dynamically selected), but if it is fixed or at least can be estimated, the tile rendering order can be used to determine how 'close' the current primitive is to the current primitive block. Specifically, it can be used to estimate how long it will take, after processing the tile that the current primitive block relates to, before the current primitive is processed. In general, the more tiles away, based on the tile rending order, the current primitive is from the current primitive block the more unlikely that the transformed geometry data related thereto will still be in the cache if the untransformed geometry data related thereto is transformed at the same time as the untransformed geometry data for the current primitive block.

Figure 9:
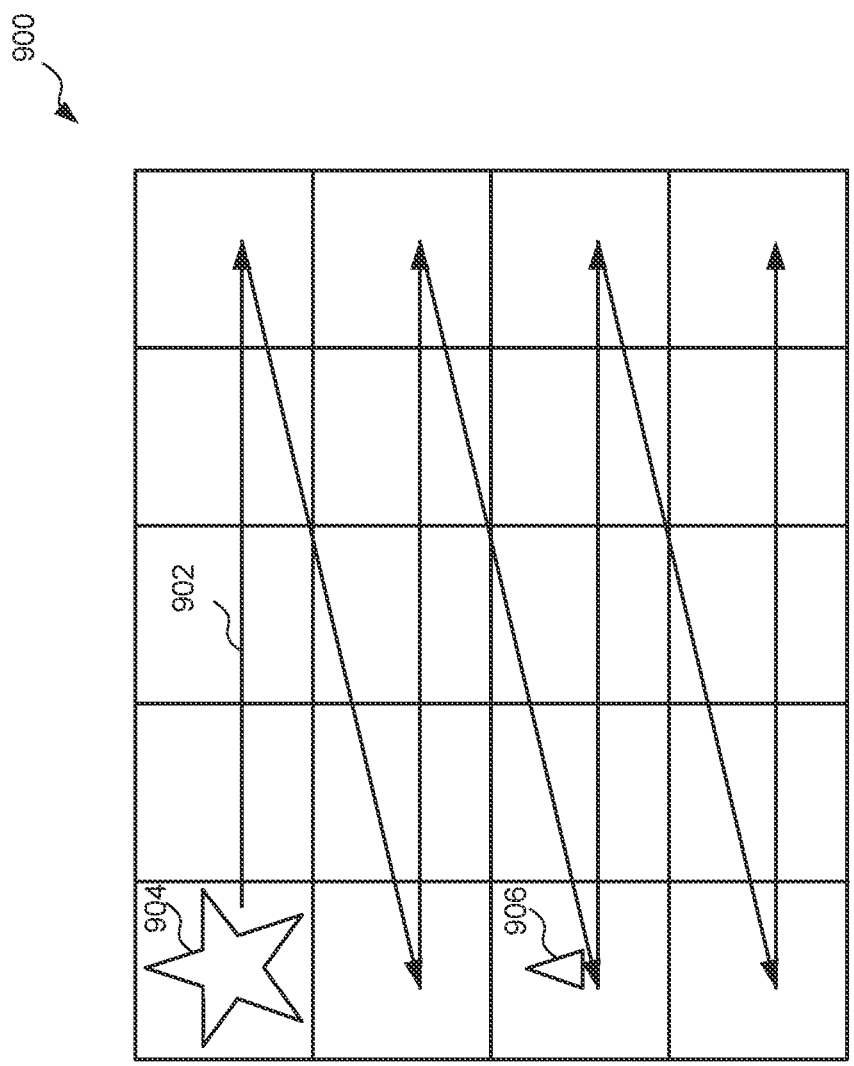
FIG. 9 is a schematic diagram illustrating an example of calculating the distance between a primitive and a primitive block based on the rendering order.

For example, FIG. 9 shows an example rendering space 900 divided into a 4×5 matrix of tiles wherein the rendering order is shown by arrows 902 (i.e. the tiles are rendered one row at a time starting with the uppermost row, and each row is rendering from left to right). In this example, the primitives in the current primitive block form an object 904 that lies in the tile in the first column and the first row, and the current primitive 906 lies in the tile in the third row and the first column. In this example the spatial distance between the current primitive 906 and the current primitive block 904 is relatively close (e.g. 2 tiles apart), but the distance between the current primitive 906 and the current primitive block 904 based on the tile rendering order is much further away (e.g. 10 tiles apart).

Although this is a simple example where the primitives of the current primitive block fall within a single tile and the current primitive also falls within a single tile, the same principles can be applied in cases where the primitives of the current primitive block fall within multiple tiles and/or the current primitive falls within multiple tiles. For example, more generally the bounding box of the current primitive and the bounding box for the current primitive block may be mapped to the tiles in the rendering space. In some cases, the distance between them may be the distance (e.g. in tiles) between the two closest tiles (according to the tile rendering order) of the two bounding boxes. For example, if the current primitive block is mapped to the 2×2 array of tiles in the top-left corner of the rendering space shown in FIG. 9 and the current primitive lies in the tile in the third column and the first row as shown in FIG. 9 then the distance would be 4 tiles. In other cases, the distance between the bounding box for the current primitive and the bounding box for the current primitive block may be determined as the distance (e.g. in tiles) between the centres of the two bounding boxes according to the tile rendering order.

Once the distance between the current primitive and the current primitive block has been determined the method 700 proceeds to block 708.

At block 708, the primitive block generator determines whether the current primitive is to be added to the current primitive block based on a comparison of the distance determined in block 706 with one or more distance thresholds, wherein the one or more distance thresholds are dynamically determined based on how full the current primitive block is. Ideally the primitive blocks are full (e.g. have the maximum number (or close to the maximum number) of primitives or vertices) and comprise primitives with spatially similar positions (e.g. they are close together) in the rendering space. However, in many cases fullness and spatial locality are competing criteria. Specifically, in many cases to make the primitive blocks full the spatial distance between the primitives in the primitive block has to increase such that the primitive blocks comprise primitives that are far apart in the rendering space. Similarly, in many cases, to ensure that the spatial distance between the primitives is small the primitive blocks become small. In addition to small primitive blocks (i.e. primitive blocks with a small number of primitives) not being able to fill up the SIMD lanes there is an overhead associated with each primitive block. Accordingly, there is a desire to find a balance between the spatial distance between the primitives in a primitive block and the fullness of the primitive blocks.

The inventors have identified that a good balance can be achieved by adjusting the thresholds based on the fullness of the current primitive block. Specifically, in some cases, the distance threshold(s) is/are higher if the current primitive block is less full, and the distance threshold(s) are lower if the current primitive block is more full. This means that when there are only a few primitives in the primitive block then the current primitive is relatively likely to be added to the current primitive block even when it is far from the primitives already in the current primitive blocks so as to fill up the primitive block. In contrast, when there are a lot of primitives in the current primitive block then the current primitive is only likely to be added to the current primitive block if it is close to the primitives already in the current primitive block. Accordingly, when the primitive block is fairly empty (e.g. comprises a small number of primitives and/or vertices) the size criteria is more important than the spatial similarity criteria—i.e. it is more important to add more primitives to the primitive block than it is to keep them spatially close; and when the primitive block is fairly full (e.g. comprises a large number of primitives and/or vertices) the spatial similarity criteria is more important than the size criteria—i.e. it is not worth adding a primitive that is spatially far away since the primitive block already has a substantial number of primitives that are spatially close together.

In some cases, the one or more distance threshold(s) may be dynamically determined from a formula based on the fullness of the current primitive block. For example, the one or more distance threshold(s) may be inversely proportional to the fullness of the current primitive block In other cases, there may be predetermined sets of one or more distance threshold(s) associated with certain ranges of fullness. For example, there may be a first set of one or more distance thresholds which are used when the current primitive block is less than a quarter full, a second set of one or more distance thresholds which are used when the current primitive block is at least a quarter full but less than half full; a third set of one or more distance thresholds which are used when the current primitive block is at least half full but less than three quarters full; and a fourth set of one or more distance thresholds which are used when the current primitive block is at least three quarters full. It will be evident to a person of skill in the art that these are examples only and that there may be a different number of sets of distance thresholds and/or the predetermined sets of distance thresholds may be matched to different ranges of fullness. In some cases, the predetermined sets of distance threshold(s) associated with the different ranges may be stored in a lookup table.

Regardless of whether the distance thresholds are dynamically determined from a formula or predetermined for certain ranges of fullness, where there are multiple distance thresholds per fullness/fullness range the distance threshold may not increase/decrease by the same amount for each distance threshold. For example, if a set of distance thresholds for a first fullness range comprises a first distance threshold of 10 and a second distance threshold of 20, a set of distance thresholds for a second fullness range may comprise a first distance threshold of 5 and a second distance threshold of 15.

The fullness of the current primitive block may be based on (i) the number of primitives in the current primitive block, and/or, (ii) where the primitives are formed by one or more vertices, the number of vertices in the current primitive block. For example, there may be a maximum number of primitives in a primitive block and/or a maximum number of vertices. The fullness of the primitive block may be equal to, for example, the ratio of the number of primitives in the current primitive block to the maximum number of primitives; the ratio of the number of vertices in the current primitive block to the maximum number of vertices; the maximum of the two ratios; or another combination of the two ratios. It will be evident to a person of skill in the art that these are examples only and that the 'fullness' of the current primitive block may be determined in any suitable manner.

Where the method 700 is used to generate transformed primitive blocks the transformed primitive blocks will comprise transformed primitives thus the number of primitives in the current primitive block is the number of transformed primitives in the current primitive block and the number of vertices in the current primitive block is the number of transformed vertices in the current primitive block. In contrast, where the method 700 is used to generate untransformed primitive blocks the untransformed primitive blocks will comprise untransformed primitives thus the number of primitives in the current primitive block is the number of untransformed primitives in the current primitive block. Where the method 700 is used to generate untransformed primitive blocks each untransformed primitive block may be associated with one or more transformed primitives and one or more transformed vertices. Where the transformed primitives are processed on an untransformed primitive basis this is all the transformed primitives associated with the untransformed primitives in the untransformed primitive block. Where, the transformed primitives are processed on a transformed primitive basis this may be the transformed primitives related to the untransformed primitives in the untransformed primitive block that are explicitly associated with the untransformed primitive block. Likewise the transformed primitive blocks may be associated with a number of transformed vertices. In these cases the fullness may also or alternatively be based on the number of transformed primitives or the transformed vertices associated with the current primitive block. Limits may be placed on the number of transformed primitives or transformed vertices associated with an untransformed primitive bock to limit the size of the corresponding transformed primitive block when it is generated in the rasterization phase.

Where the distance comprises a single metric (e.g. the ratio of areas of the bounding boxes, or the difference between x dimensions of the bounding boxes) then there may be a single distance threshold. In these cases, the primitive block generator may determine that the current primitive is to be added to the current primitive block if the distance is less than the distance threshold, and is not to be added to the current primitive block otherwise. Where the distance comprises a plurality of metrics (e.g. triple (a, b, c)) there may be a single distance threshold or multiple distance thresholds. For example, in some cases the plurality of distance metrics may be combined in some fashion and the combined metric may be compared to a single distance threshold. In other cases, there may be a plurality of distance thresholds which are compared to different distance metrics. For example, if the distance comprises a triple (a, b, c) wherein a is the ratio of x dimensions of the bounding boxes, b is the ratio of y dimensions of the bounding boxes, and c is the ratio of the areas of the bounding boxes there may be three distance thresholds against which one of the distance metrics is compared. In these cases, the primitive block generator may be configured to determine that the current primitive is not to be added to the current primitive block if only a subset (e.g. only one) of the distance threshold are exceeded or only if all of the distance thresholds are exceeded.

If it is determined from the comparison of the distance to the one or more distance thresholds that the current primitive is not to be added to the current primitive block, then the method 700 proceeds to block 710. If, however it is determined from the comparison of the distance to the one or more distance thresholds that the current primitive is to be added to the current primitive block then the method 700 proceeds directly to block 712.

At block 710, after determining that the current primitive is not to be added to the current primitive block, the primitive block generator flushes the current primitive block. Flushing the current primitive block comprises outputting the contents of the current primitive block (e.g. the information identifying the primitives in the primitive blocks) and emptying the current primitive block. Outputting the primitive block may comprise writing the current primitive block to memory (e.g. memory $302_2$). Accordingly at the end of the flush the current primitive block contents have been output (e.g. for use in the rasterization phase of TBR) and the (new) current primitive block is empty. Once the current primitive block has been flushed the method 700 proceeds to block 712.

At block 712, the primitive block generator adds the current primitive to the current primitive block. Where the method 700 is used to generate untransformed primitive blocks, adding the current primitive to the current primitive block may comprise adding information to the current primitive block identifying the untransformed primitive related to the current primitive. As described above, where the primitives are defined by one or more vertices the information identifying the primitive may comprise information identifying the vertices that form that primitive which allows the untransformed geometry data related thereto to be retrieved. For example, where the primitives are triangles defined by three vertices the information identifying the primitive may comprise information identifying the three vertices that form that primitive. In some cases, the information identifying a particular vertex may be an index of the vertex as sent from the application which points to the portion of the memory storing the untransformed geometry data (e.g. vertex buffer) that relates to that vertex. Where transformed primitives are added to primitive blocks on a transformed primitive basis, in addition to adding information identifying the untransformed primitive bock related to the current primitive, information identifying that particular transformed primitive may also be added. Where the method 700 is used to generate transformed primitive blocks, adding the current primitive to the current primitive block may comprise adding the transformed geometry data related to the current primitive to the current primitive block.

Where block 712 is executed directly after block 710 or block 704 the current primitive block will be empty such that the current primitive becomes the first primitive in the current primitive block. If, however block 712 is executed directly after block 708 then the current primitive block will already comprise one or more primitives and the current primitive is added to those primitives. Once the current primitive has been added to the current primitive block the method 700 proceeds to block 714.

At block 714, the primitive block generator determines whether the current primitive block is now full. As described above, in some cases there may be a maximum number of primitives and/or a maximum number of vertices in a primitive block. In these cases, the primitive block generator may determine that the current primitive block is full if the number of primitives and/or the number of vertices in the primitive block is equal to the maximum number of primitives or the maximum number of vertices respectively. If it is determined that the current primitive block is now full then the method 700 proceeds to block 716 where the primitive block is flushed (as described above with respect to block 710). If, however it is determined that the current primitive is not full then the method 700 proceeds to block 718.

At block 718, the primitive block generator determines whether there are any more primitives to process. If there is at least one additional primitive to process, then the method 700 returns to block 702. If, however, there are no more primitives to process then (so long as the current primitive block is not empty) then the current primitive block is flushed (as described above with respect to block 710) and the method 700 ends.

In other examples, where the primitives are formed by one or more vertices, after it is determined at block 708 that, based on the comparison between the distance between the current primitive and the current primitive block and the one or more distance thresholds, the current primitive is not to be added to the current primitive block the primitive block generator may be configured to, before proceeding to block 710 where the current primitive block is flushed, determine whether the current primitive shares at least one vertex with one of the primitives in the current primitive block. If the primitive block generator determines that the current primitive shares at least one vertex with a primitive in the current primitive block then the primitive block generator may determine that the current primitive is to be added to the current primitive block even though the distance threshold(s) are not met, or may determine that the current primitive is to be added to the current primitive block if certain conditions are met. For example, if the current primitive shares at least one vertex with a primitive in the current primitive block then the distance may be compared against a different set of one or more distance thresholds or a different criterion may be used to determine if the current primitive should be added to the current primitive block. For example, if the current primitive shares at least one vertex with a primitive in the current primitive block the current primitive may be added to the current primitive block if the area of the bounding box of the current primitive block with the current primitives is less than a threshold (e.g. less than a predetermined number of tiles).

In some cases, it may be advantageous for all of the primitives in a primitive block to share the same render state data (e.g. the same depth compare mode and type of primitive). In these cases, prior to executing block 704 the primitive block generator may determine whether the render state data for the current primitive is the same as (or matches) the render state data for the primitives in the current primitive block. If the primitive block generator determines that the render state data for the current primitive is different than the render state data for the primitives in the current primitive block, then the current primitive block may be flushed before the method 700 proceeds to block 704. If, however, the primitive block generator determines that the render state data for the current primitive is the same (or matches) the render state data for the primitives in the current primitive block then the method 700 may proceed directly to block 704.

Although the method 700 of FIG. 7 describes how to generate primitive blocks by determining whether to add received primitives to a single pending primitive block based on the distance between the received primitive and the primitive block and the fullness of the primitive block, in other examples the primitive block generator may maintain multiple pending primitive blocks and may determine whether to add a received primitive to one of the pending primitive blocks based on the distance between the received primitive and each of the pending primitive blocks and the fullness of the pending primitive blocks. For example, a received primitive may be added to one of the pending primitive blocks by comparing the distance for each pending primitive block to a set of one or more distance thresholds for that pending primitive block where the set of one or more distance thresholds is based on the fullness of that pending primitive block. If the comparisons of the distances with the distance thresholds indicates that the received primitive can be added to one of the pending primitive blocks, then the received primitive may be added to that pending primitive block. If, however, the comparison of the distances with the distance thresholds indicates that the received primitive can be added to a plurality of the pending primitive blocks then the received primitive block may be added to one of those pending primitive blocks or the relevant pending primitive blocks may be merged.

Although in the method 700 of FIG. 7 a current primitive can only form part of a single primitive block (e.g. a primitive is either added to the current primitive block as is, or the current primitive block is flushed and then the primitive is added to the current primitive block), in other example methods a current primitive may be added to multiple primitive blocks. For example, if the distance for the current primitive meets the distance thresholds to be added to the current primitive block, but it is close to the threshold then the current primitive may be added to the current primitive block, then the current primitive block may be flushed and the same primitive may be added to the (new) current primitive block after the flush.

Figure 10:
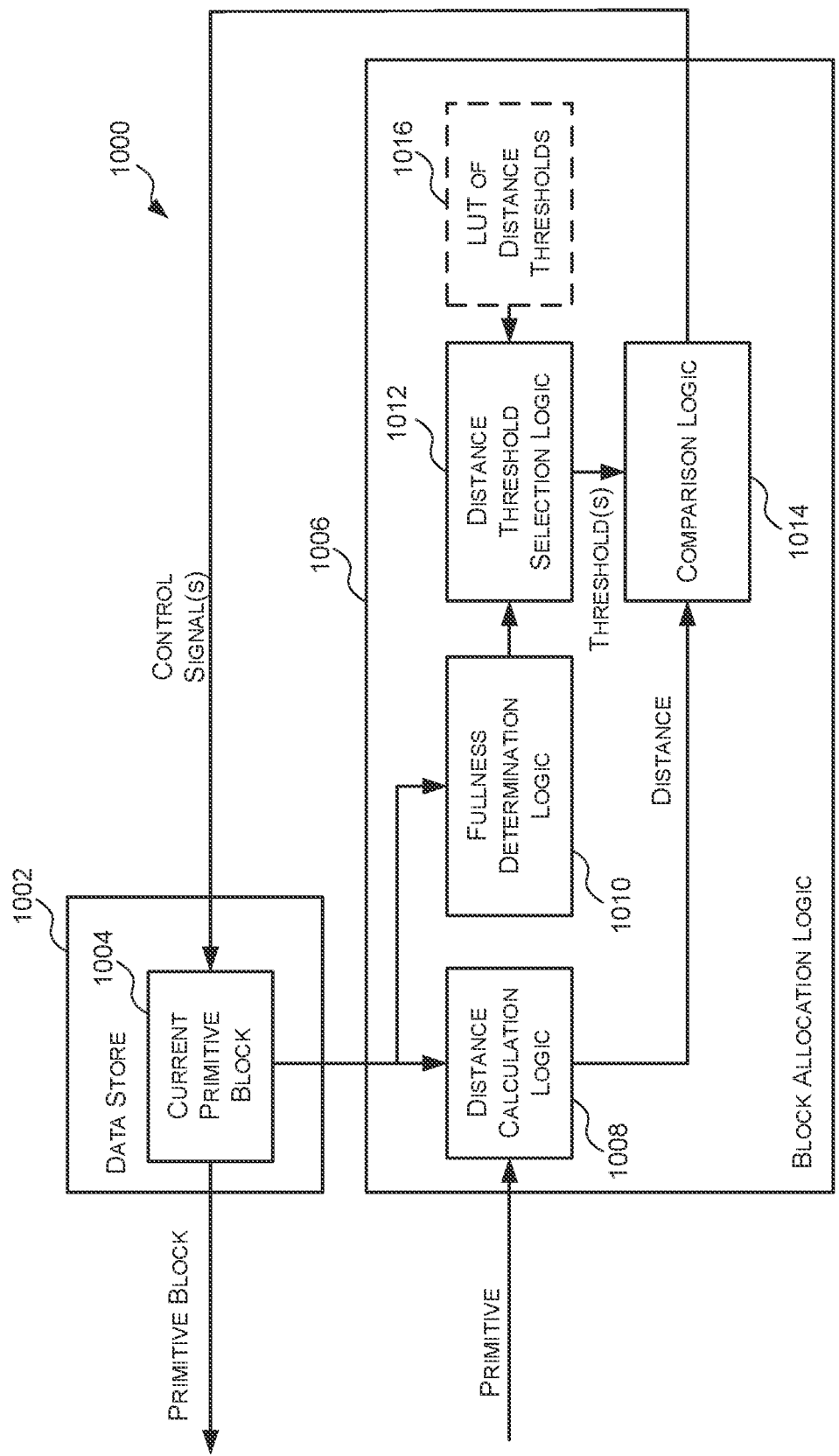
FIG. 10 is a block diagram of an example primitive block generator.

Reference is now made to FIG. 10 which illustrates an example implementation of a primitive block generator 1000 which may be used to implement the method 700 of FIG. 7. The primitive block generator 1000 of FIG. 10 comprises a data store 1002 for storing a current primitive block 1004 to which new primitives can be added, and block allocation logic 1006 for determining whether new primitives should be added to the current primitive block based on the distance between the primitive and the current primitive block; and the fullness of the current primitive block.

The block allocation logic 1006 may comprise distance calculation logic 1008, fullness determination logic 1010, distance threshold selection logic 1012 and comparison logic 1014. The distance calculation logic 1008 is configured to receive transformed position data for a current primitive and determine the distance between the spatial position of the current primitive and the spatial position of the current primitive block 1004 based on the transformed position data. The transformed position data describes the position of the primitive in the render space (e.g. screen space). As described above, where each primitive is defined by one or more vertices the transformed position data may comprise information indicating the position of the vertices (e.g. X, Y and Z coordinates) that form that primitive. The transformed position data for the primitive may have been generated by the transformation logic 308 of the system 300 of FIG. 3.

The distance is a metric or a set of metrics that describes how 'close' the current primitive is to the current primitive block (i.e. the primitives forming the primitive block). The distance calculation logic 1008 may be configured to determine the distance between the current primitive and the current primitive block from the transformed position data in any suitable manner. In particular, the distance calculation logic 1008 may be configured to determine the distance in accordance with any of the methods described above in reference to block 706 of the method 700 of FIG. 7. For example, the distance calculation logic 1008 may be configured to determine the distance (i) by comparing a bounding box of the current primitive block without the current primitive to a bounding box of the current primitive block with the current primitive; and/or (ii) from the tile rendering order. For example, in some cases the distance calculation logic 1008 may be configured to determine the distance as: a difference or ratio between the x dimensions of the bounding boxes; a difference or ratio of the y dimensions of the bounding boxes; a difference or ratio of the area of the bounding boxes; or any combination thereof. The distance may comprise a single metric (e.g. the ratio of the x dimensions of the bounding boxes) or multiple metrics (e.g. a triple (a, b, c) wherein a is the ratio of the x dimensions of the bounding boxed; b is the ratio of the y dimensions of the bounding boxes; and c is the ratio of the areas of the bounding boxes).

The fullness determination logic 1010 is configured to generate a fullness metric for the current primitive block 1004 that indicates the fullness of the current primitive block. The fullness of the current primitive block 1004 may be determined in any suitable manner. For example, as described above, in some cases the primitive blocks may have a maximum number of primitives and/or a maximum number of vertices. In these cases, the fullness determination logic 1010 may be configured to determine the fullness metric based on comparing the number of primitives in the current primitive block and/or the number of vertices in the current primitive block to the maximum number of primitives and vertices respectively. For example, the fullness metric may be equal to the ratio of the number of primitives in the current primitive block to the maximum number of primitives; the ratio of the number of vertices in the current primitive block to the maximum number of vertices; the larger of the two ratios; or a combination of the two ratios.

The distance threshold selection logic 1012 is configured to dynamically select, based on the fullness metric (generated by the fullness determination logic 1010) a set of one or more distance thresholds to be used to determine if the current primitive is to be added to the current primitive block. As described above, the inventors have identified that a good balance between having full primitive blocks, and having primitive blocks that comprise primitives that are close together can be achieved by adjusting the distance threshold(s) that are used to determine whether a new primitive is to be added to the current primitive block based on the fullness of the current primitive block. Specifically, dynamically adjusting the distance threshold(s) such that when the current primitive block is less full, primitives that are further away from the primitives in the current primitive block can be added thereto, and when the current primitive block is fuller only primitives that are close to the primitives in the current primitive block can be added thereto.

The set of distance threshold(s) that are used for a particular fullness metric may be determined in any suitable manner. For example, the set of distance threshold(s) that are used for a particular fullness metric may be determined using any of the methods described above with respect to block 708 of the method 700 of FIG. 7. As described above, in some cases, the set of distance threshold(s) for a particular fullness metric may be dynamically determined according to a formula. For example, the set of distance threshold(s) may be inversely proportional to the fullness of the current primitive block. In other cases, there may be predetermined sets of one or more distance threshold(s) that are associated with each of a plurality of ranges of fullness metrics. The distance threshold selection logic 1012 may then be configured to select a set of one or more distance thresholds from the predetermined sets of one or more distance thresholds based on the fullness metric. For example, there may be one set of one or more distance thresholds which is to be used when the fullness metric indicates that the current primitive block is less than one quarter full, a second set of one or more distance thresholds which is to be used when the fullness metric indicates that the current primitive block is at least a quarter full but less than half full, a third set of one or more distance thresholds which is to be used when the fullness metric indicates that the current primitive block is at least half full but less than three quarters full, a fourth set of one or more distance thresholds which is to be used when the fullness metric indicates that the current primitive block is at least three quarters full. Where there are predetermined sets of one or more distance thresholds, they may be stored in a look-up table 1016 or a similar structure.

The number of distance thresholds in a set may be based on the number of metrics used for the distance and/or one or more other criteria. For example, where the distance comprises a single metric (e.g. the distance is equal to the ratio of the areas of the bounding boxes) then a set of distance thresholds may comprise a single distance threshold which is compared to the single distance metric. Where the distance comprises a plurality of metrics (e.g. the distance comprises a triple (a, b, c) wherein a is the ratio of the x dimensions of the bounding boxes, b is the ratio of the y dimensions of the bounding boxes, and c is the ratio of the areas of the bounding boxes) then a set of distance threshold(s) may comprise one or more distance thresholds. For example, there may be a single distance threshold that is compared to a combination of the distance metrics or there may be a distance threshold per distance metric which is compared against the corresponding distance metric.

The comparison logic 1014 is configured to determine whether the current primitive is to be added to the primitive block based on a comparison of the distance (as calculated by the distance calculation logic 1008) and the distance threshold(s) (as generated by the distance threshold selection logic 1012) and to output one or more control signals to control the current primitive block based on the determination. Specifically, if the comparison logic 1014 determines based on the comparison(s) that the current primitive is to be added to the current primitive block then the comparison logic 1014 may output one or more control signals which cause the current primitive to be added to the current primitive block. In some cases, causing the current primitive to be added to the primitive block may comprise causing information identifying the untransformed primitive to which the current primitive relates to the current primitive block. In other cases, causing the current primitive to be added to the primitive block may comprise causing the transformed geometry data related to the current primitive to be added to the current primitive block. In contrast, if the comparison logic 1014 determines based on the comparison(s) that the current primitive is not to be added to the current primitive block then the comparison logic 1014 may output one or more control signals which cause the current primitive block to be flushed (e.g. the contents output (e.g. written out to memory) and then emptied) and then cause the current primitive to be added to the empty current primitive block.

Transformed Geometry Data Cache

As described above, once the untransformed geometry data for a primitive block has been transformed by the transformation logic 313, the transformed geometry data for that primitive block (which may be referred to herein as the transformed primitive block) is stored in a cache 315 (which may be referred to herein as the transformed geometry data cache) where it can be accessed by the subsequent modules of the rasterization phase (e.g. the HSR logic 314 and the texturing/shading logic 316). Since the transformed geometry cache 315 is generally not large enough to store each and every transformed primitive block required to render the image, when the transformed geometry cache 315 becomes full it is desirable to have a mechanism for determining which transformed primitive block(s) to evict from the cache 315. In other words, it is desirable to have a mechanism to know when it is safe to evict a transformed primitive block from the cache 315.

In some graphics processing systems, such as the graphics processing system 300 of FIG. 3, the processing of the transformed geometry data for a tile in the rasterization phase is performed in a plurality of stages. For example, hidden surface removal may be performed in a first stage, and texturing and shading may be performed in a second stage. As described in more detail below, in some cases the hidden surface removal stage may be further divided into a plurality of sub-stages. A hidden surface removal stage and a texturing and shading stage both typically access the transformed geometry data related to the tile that is being processed. Accordingly, it may not be safe to remove a transformed primitive block associated with a tile until both stages have accessed the transformed primitive block. However, not all of the primitives related to a particular tile may make it through all stages. For example, while hidden surface removal may be performed on all primitives associated with a tile, not all of those primitives may make it through the hidden surface removal stage to the texturing and shading stage (e.g. some may be hidden). Thus there may be some transformed primitive blocks associated with a tile that can be evicted after the hidden surface removal stage (or a sub-stage thereof as described below) because all of the relevant primitives of that transformed primitive block are hidden, whereas other transformed primitive blocks associated with the tile cannot be evicted until the texturing and shading stage is complete.

Furthermore, in some graphics processing systems it may be possible to have the transformed geometry data for multiple tiles being processed at the same time because the plurality of stages of the transformed geometry data processing may be pipelined (e.g. at any time the transformed geometry data associated with one tile may be being processed at each of the stages) and/or there may be a plurality of parallel logic (e.g. pipelines) for processing transformed geometry data.

Accordingly, the inventors have determined that an efficient mechanism for keeping track of which transformed primitive blocks can be evicted is keeping track (via a counter) of the number of tiles that are currently being processed in the rasterization phase that require that transformed primitive block, wherein a tile may be deemed to no longer require a transformed primitive block after any of the plurality stages of the transformed geometry data processing. In other words, a transformed primitive block can be deemed available for eviction even if a tile that is associated with that transformed primitive block is still being processed if a transformed primitive block is no longer needed after, for example, the first stage of the transformed geometry data processing. This mechanism ensures that a transformed primitive block will not be evicted when it is known that it will be used again, but is made available for eviction as soon as it is no longer required. Making a transformed primitive block available for eviction does not mean that it will not be needed by another tile later, only that is not required by any of the tiles currently being processing in the rasterization phase and thus can be safely evicted. If a later tile requires access to a transformed primitive block that was evicted, then the untransformed geometry data for that primitive block will have to be fetched and transformed again.

Figure 11:
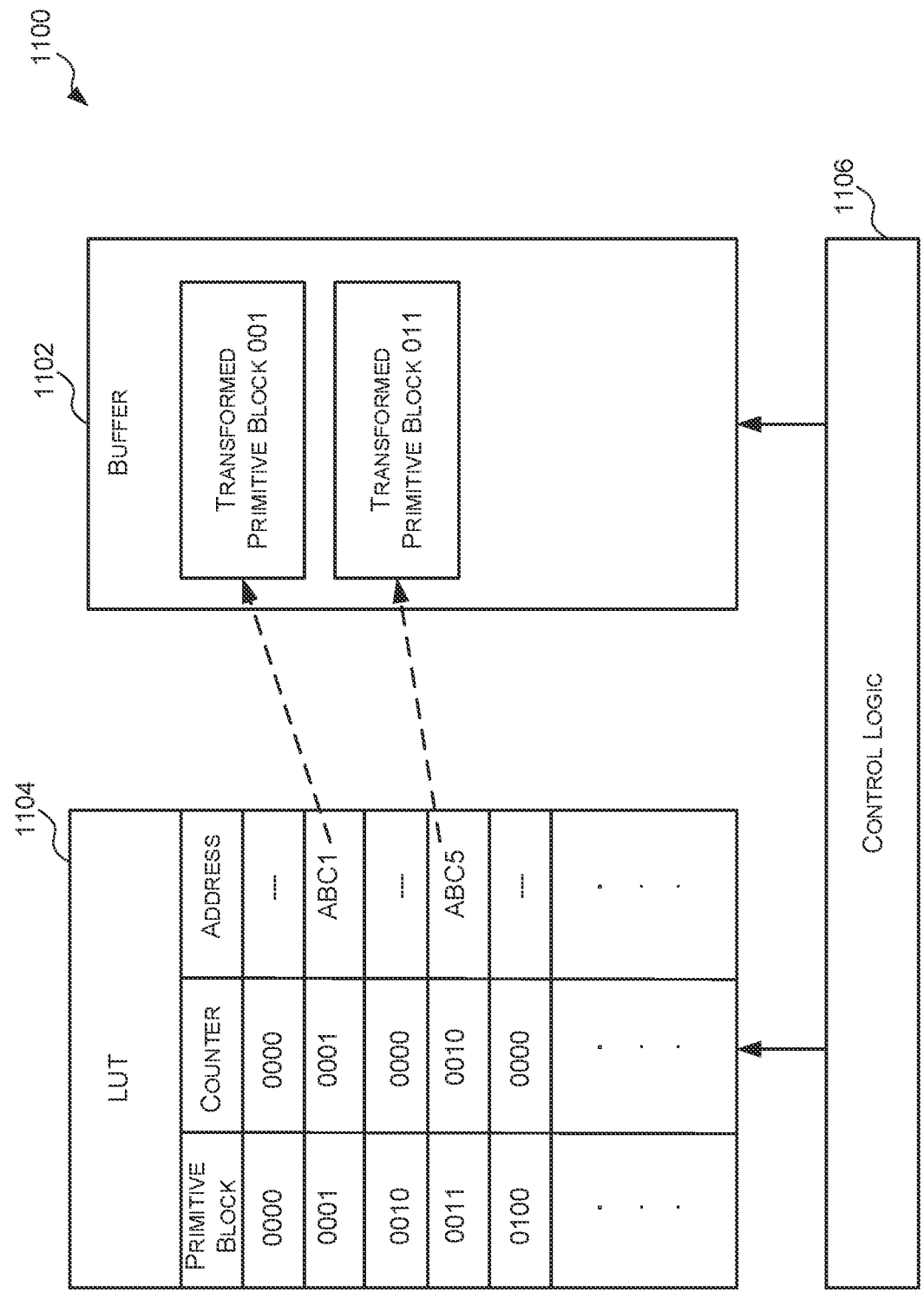
FIG. 11 is a block diagram of an example transformed geometry data cache.

Reference is now made to FIG. 11 which illustrates an example transformed geometry data cache 1100 which may be used to implement the transformed geometry data cache 315 of the system 300 of FIG. 3. The transformed geometry cache 1100 comprises memory 1102 (e.g. a buffer) for temporarily storing transformed geometry data (e.g. transformed primitive blocks); a look-up table 1104 for storing, for each primitive block, information indicating the location of the transformed geometry data related thereto and a counter indicating whether it is safe to evict the transformed geometry data; and control logic 1106 for storing transformed primitive blocks in the memory 1102 and maintaining the counters so that they reflect the number of tiles currently being processed by the rasterization logic that require access to that transformed primitive block.

Figure 12:
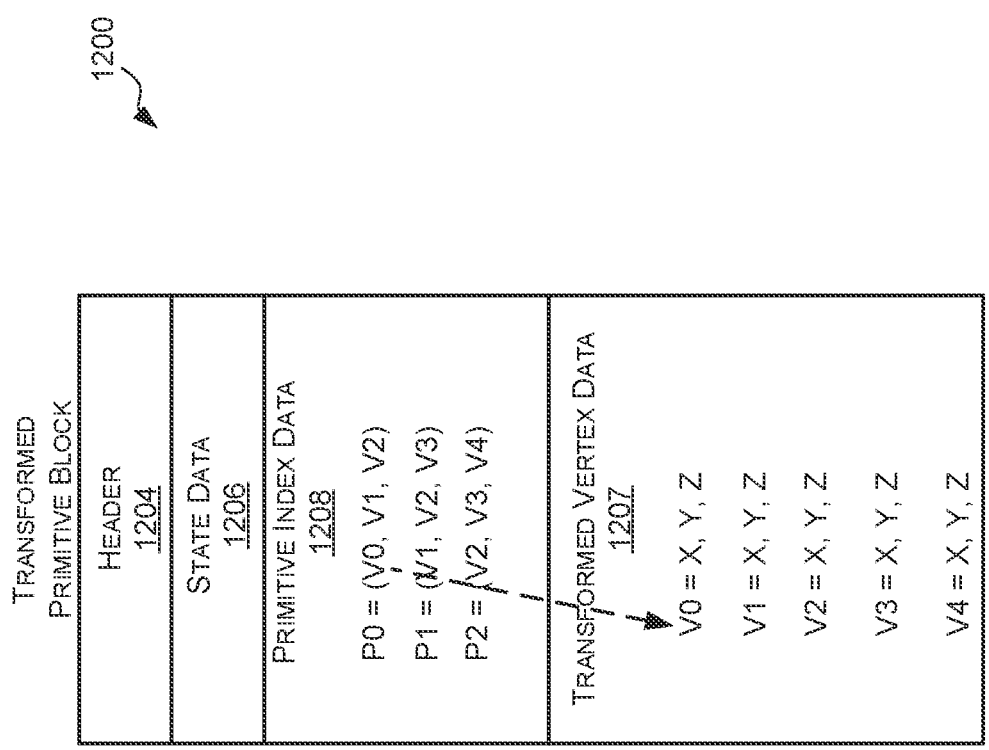
FIG. 12 is a schematic diagram illustrating an example transformed primitive block.

The memory 1102 is configured to temporarily store transformed geometry data for processing in the rasterization phase. In graphics processing systems, such as the graphics processing system 300 of FIG. 3, the untransformed geometry data is fetched and transformed on a primitive block basis, so the transformed geometry data related to a primitive block may be stored together as a transformed primitive block. An example format for a transformed primitive block 1200 is shown in FIG. 12. In this example, the transformed primitive block 1200 comprises a header 1204, state data 1206, transformed vertex data 1207, and primitive index data 1208. The header 1204, like the header 404 of the untransformed primitive blocks 402₁, 402₂ of FIG. 4, comprises information that describes the primitive block such as, but not limited to, the number of vertices in the primitive block and/or the number of primitives in the primitive block. The state data 1206, like the state data 406 of the untransformed primitive blocks 402₁, 402₂ of FIG. 4, comprises information that describes how the primitives in the primitive block are to be rendered. The state data can be described as identifying the recipe for rendering the primitives described in the primitive block. For example, the state data may include, but is not limited to, information identifying a depth compare mode, a blending state, a texture state, and and/or a primitive type.

The transformed vertex data 1207 comprises transformed geometry data for each vertex associated with a primitive in the primitive block. The transformed geometry data for each vertex may comprise, for example, a set of coordinates (e.g. X, Y, Z coordinates) in the rendering space (e.g. screen space) to describe the position of the vertex and a set of attributes to describe the appearance of the vertex, such as texture coordinates (e.g. U, V coordinates) and/or a base colour to apply to the vertex. Each vertex in the primitive block may be identified by a vertex index which is local to the primitive block. For example, where the maximum number of vertices per primitive block is 64, each vertex may be assigned a local index between 0 and 63.

The primitive index data 1208, like the primitive index data 408 of the untransformed primitive blocks 402₁, 402₂ of FIG. 4, comprises a set of indices for each primitive that identify the vertices that form that primitive. For example, where the primitives are triangles formed by three vertices the primitive index data 1208 may comprise, for each primitive, information identifying the three vertices that form that primitive. However, while the indices in the primitive index data 408 of FIG. 4 are the indices of the vertex sent from the application, the indices in the primitive index data 1208 of FIG. 12 are the local indices. In this way each vertex index acts as pointer to the portion of the transformed geometry in the transformed primitive block that relates to that vertex.

As described above, each primitive block may be referenced by (or associated with) a plurality of tiles. In other words, the primitives of a primitive block may fall, at least partially within, a plurality of tiles. In some cases, the tiling engine 310 may be configured keep track of the number of tiles that reference (or are associated with) each primitive block and this information may be provided to the fetch logic 312 when a primitive block is fetched from memory 302₂. For example, the number of tiles that reference (or are associated) with a particular primitive block may be stored, for example, in the header portion of the primitive block or the number of tiles that reference (or are associated with) a particular primitive block may be provided to the fetch logic 312 as sideband data. In these cases, the memory 1102 (e.g. buffer) may be divided into a plurality of sub-memory blocks and the control logic 1106 may be configured to determine which sub-memory block to store a new transformed primitive block based on the number of tiles that refer to (or are associated with) that primitive block.

Figure 13:
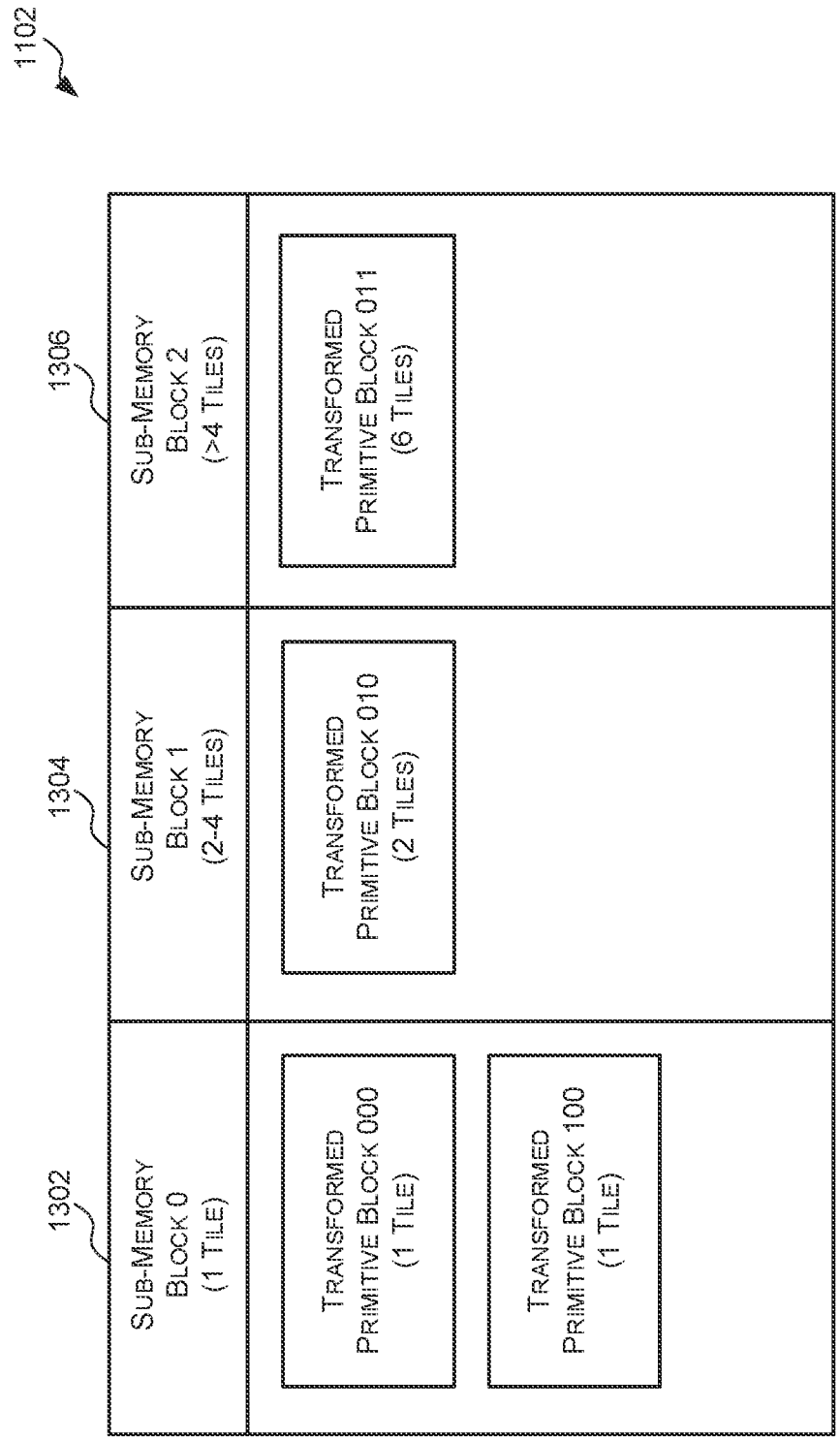
FIG. 13 is a schematic diagram illustrating an example transformed geometry data cache that has been divided into a plurality of sub-memory blocks.

For example, FIG. 13 illustrates an example where the memory 1102 is divided into three sub-blocks of memory 1302, 1304, and 1306. In this example, the first sub-block 1302 is used to store transformed primitive blocks associated with only 1 tile; the second sub-block 1304 is used to store transformed primitive blocks associated with 2-4 tiles; and the third sub-block 1306 is used to store transformed primitive blocks associated with more than 4 tiles. It will be evident to a person of skill in the art that this is an example only and there may be a different number of sub-memory blocks and/or they may be associated with different ranges of tiles. Since transformed primitive blocks that are associated with a smaller number of tiles are likely to be available for eviction sooner a larger block of 'free' memory may be obtained more quickly than if the transformed primitive blocks associated with a small number of tiles (e.g. 1 tile) are not stored together. This may be advantageous in cases where the memory 1102 is divided into pages and only a whole page can be freed or de-allocated at a time. The sub-memory blocks may all be the same size or two or more of the sub-memory blocks may have different sizes.

The look-up table 1104 is configured to store, for each transformed primitive block stored in the memory 1102, information identifying the location of the transformed primitive block in the memory 1102 (e.g. buffer) and a counter that indicates whether or not the transformed primitive block can be evicted from the memory 1102 (e.g. buffer). As shown in FIG. 11, in some cases the information identifying the location of the transformed primitive block may be an address of the transformed primitive block in memory. However, it will be evident to a person of skill in the art that this is an example only and other information may be stored in the look-up table 1104 to identify the location of the transformed primitive block in memory. For example, in other cases, the information identifying the location of the transformed primitive block in memory may be an index which can be used to generate the address of the transformed primitive block in memory. When a transformed primitive block is written to the memory (e.g. by the transformation logic 313) an entry in the look-up table may be added to the look-up table.

In some cases, when the memory 1102 does not comprise a transformed primitive block then the look-up table may not have an entry for that transformed primitive block. For example when a transformed primitive block is evicted from the memory 1102 (e.g. buffer) the corresponding entry in the look-up table 1104 may be removed. This allows it to be determined from the look-up table whether the cache 1100 comprises a particular transformed primitive block.

The counter for an untransformed primitive block is used to indicate whether or not the transformed primitive block can be evicted from the cache (i.e. from memory 1102). In some cases, the counter for a transformed primitive block may be set to a first predetermined value (e.g. 0) when the transformed primitive block can be evicted (i.e. when none of the tiles currently being processed in the rasterization phase need to access that transformed primitive block) and set to one of one or more second predetermined values (e.g. an integer>0) when the transformed primitive block cannot be evicted (i.e. when at least one of the tiles currently being processed in the rasterization phase needs to access that transformed primitive block).

The control logic 1106 is configured to store transformed primitive blocks (e.g. received from the transformation logic 313) in the memory 1102 and maintain the counters in the look-up table 1104 to indicate which transformed primitive blocks can be evicted from the memory 1102 and which cannot. Specifically, the control logic 1106 is configured to maintain (e.g. dynamically adjust) the counters in the look-up table 1104 so that they indicate how many tiles currently being processed by the rasterization logic 306 require access to the corresponding transformed primitive block. When a counter indicates that there are no tiles currently being processed by the rasterization logic 306 that require access to a particular transformed primitive block then that transformed primitive block can be evicted. In these examples, a tile currently being processed by the rasterization logic may be deemed to no longer require access to a primitive when any of the stages of the transformed geometry data processing (e.g. after the HSR stage, or after the texturing/shading stage) indicate that the transformed geometry block is no longer required. When the control logic 1106 receives a new transformed primitive block (e.g. from the transformation logic 313) for storing in the cache 1100 and the cache 1100 is full (e.g. the memory 1102 is full) then the control logic 1106 selects one of the transformed primitive blocks to evict based on the counters. The operation of the control logic 1106 will be described in more detail by way of the method 1400 of FIG. 14.

Figure 14:
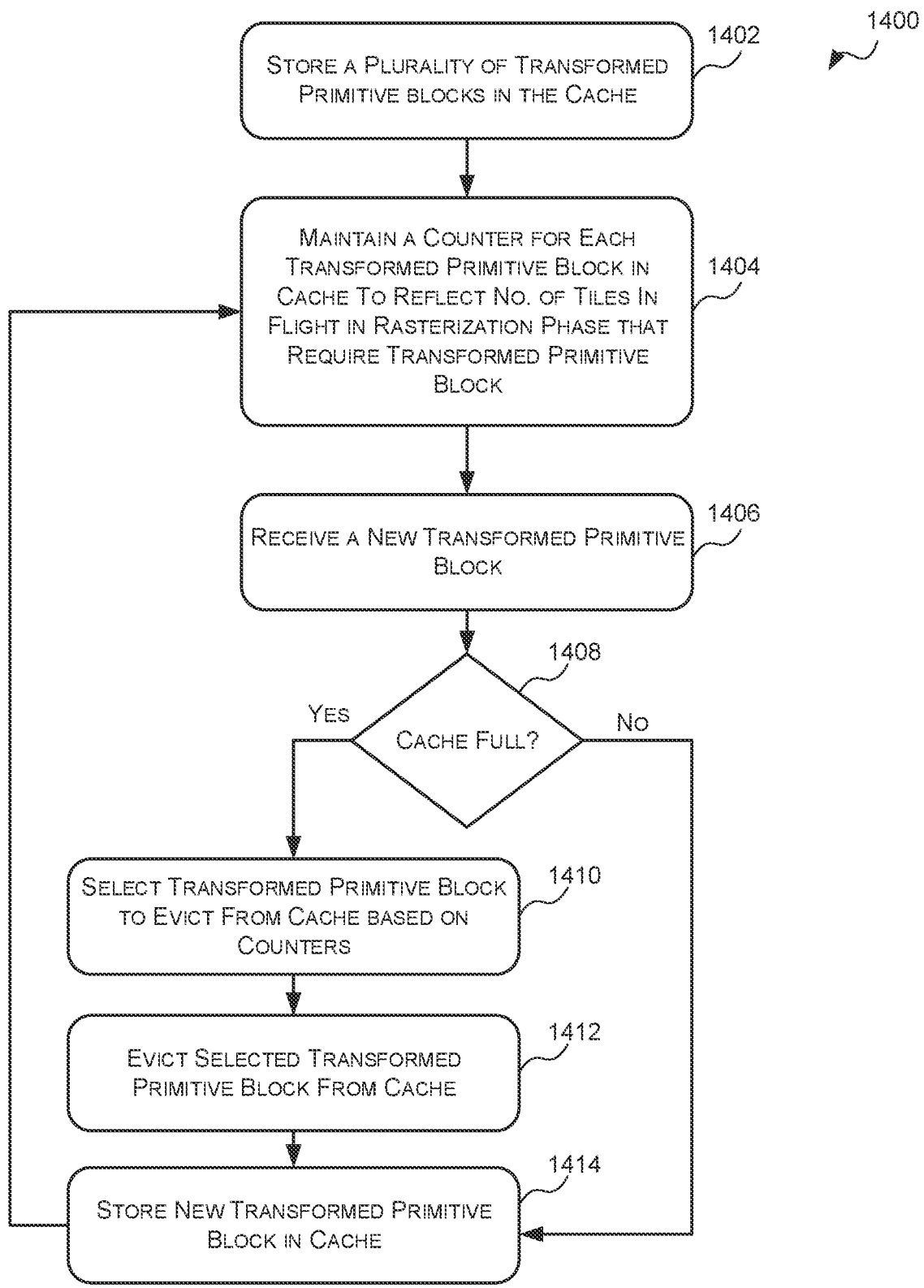
FIG. 14 is a flow diagram of an example method for storing transformed primitive blocks in a transformed geometry data cache.

Reference is now made to FIG. 14 which illustrates a method 1400 which may be executed by the control logic 1106 to manage the cache 1100. The method 1400 begins at block 1402 where the control logic 1106 stores a plurality of transformed primitive blocks in the memory 1102 (e.g. buffer) of the cache 1100. When each of the transformed primitive blocks were stored in the memory the look-up table 1104 may have been updated to include information (e.g. an address) indicating the location of the transformed primitive block in the memory 1102 (e.g. buffer).

At block 1404, the control logic 1106 maintains (e.g. dynamically updates) a counter (e.g. the counter in the look-up table 1104) for each of the transformed primitive blocks stored in the cache 1100 (e.g. the memory 1102 (e.g. buffer)) to indicate the number of tiles that are currently being processed by the rasterization logic 306 and require that transformed primitive block. The control logic 1106 may be configured to adjust (e.g. increment) the counter for a transformed primitive block to indicate that an additional tile is being processed by the rasterization logic that requires access to the transformed primitive block when the control logic 1106 detects that the rasterization logic has begun processing a new tile associated with the primitive block. The control logic 1106 may also be configured to adjust (e.g. decrement) the counter for that transformed primitive block to indicate that one less tile is being processed by the rasterization logic that requires access to the transformed primitive block when the control logic 1106 detects from any of the plurality of stages that a tile associated with the transformed primitive block no longer requires the transformed primitive block. As described above, by adjusting the counter after any of the stages of the rasterization phase a transformed primitive block can be marked for eviction sooner. Specifically, the processing of the rasterization of a tile that is associated with a transformed primitive block does not have to be complete for the transformed primitive block to be marked for eviction. This allows for more efficient use of the cache 1100 memory 1102.

A transformed primitive block is said to be associated with a tile if at least one primitive in the transformed primitive block falls, at least partially, within the bounds of that tile. As described above with respect to FIG. 3 the tiling module determines which primitives (when transformed) fall, at least partially, within the bounds of the tile and generates a display list for each tile that identifies the primitives that fall, at least partially, within the bounds of that tile and the primitive block in which the primitive is in. When the rasterization phase begins processing a tile the fetch module fetches the display list for that tile. The fetch module then determines, for each untransformed primitive block identified in the untransformed display list, whether the cache 1100 comprises transformed geometry data (e.g. transformed primitive blocks) for that untransformed primitive block (e.g. by sending a query to the control logic 1106). Then if the cache 1100 does not comprise transformed geometry data (e.g. a transformed primitive block) for an untransformed primitive block the fetch module obtains the untransformed geometry data corresponding to that untransformed primitive block and provides the untransformed geometry data to the transformation logic 313 for transformation. The transformed geometry data for an untransformed primitive block is then stored in the cache.

Accordingly, in some cases, the control logic may be configured to detect that the rasterization logic 306 has begun processing a new tile associated with a particular transformed primitive block (i) when the control logic receives a request (e.g. from the transformation logic 313) to add that transformed primitive block to the cache 1100; or (ii) when the control logic receives a request (e.g. from the fetch logic) to know whether the cache 1100 comprises that transformed primitive block and that transformed primitive block is already in the cache 1100. It will be evident to a person of skill in the art that this is an example only and the control logic 1106 may detect that that the rasterization logic 306 has begun processing a new tile associated with a particular transformed primitive block in another manner.

As described above, the control logic 1106 may be configured to adjust (e.g. decrement) the counter for a transformed primitive block to indicate that there is one less tile that is being processed by the rasterization logic that requires access to the transformed primitive block when any of the plurality of stages indicate that a tile associated with the transformed primitive block no longer requires the transformed primitive block. For example, where the rasterization phase comprises two transformed geometry data processing stages—a hidden surface removal stage and a texturing/shading stage—the control logic 1106 may be configured to adjust (e.g. decrement) the counter for a transformed primitive block to indicate there is one less tile that is being processed by the rasterization logic that requires access to the transformed primitive block if either stage (e.g. either the HSR stage or the texturing/shading stage) indicates that the tile no longer requires the transformed primitive block.

As described above, a hidden surface removal stage is configured to eliminate primitive fragments that are hidden. The HSR stage (e.g. the output of the HSR logic 314) may indicate that a tile no longer needs access to a transformed primitive block when the HSR stage does not output any fragments that relate to a primitive in that transformed primitive block. In some cases, the HSR stage may be configured to, when it receives a set of primitive fragments, receive an indication of which transformed primitive block it relates. If the HSR stage determines that primitive fragments from a transformed primitive block were received but none output then it may notify the control logic 1106. For example, the HSR stage may receive the primitive fragments to process as a stream of data and there may be markers inserted in the stream to separate primitives and to separate primitive blocks. The HSR stage may be configured to determine that a primitive block is no longer needed when its outputs two primitive block markers without any primitive fragments output in between.

Figure 15:
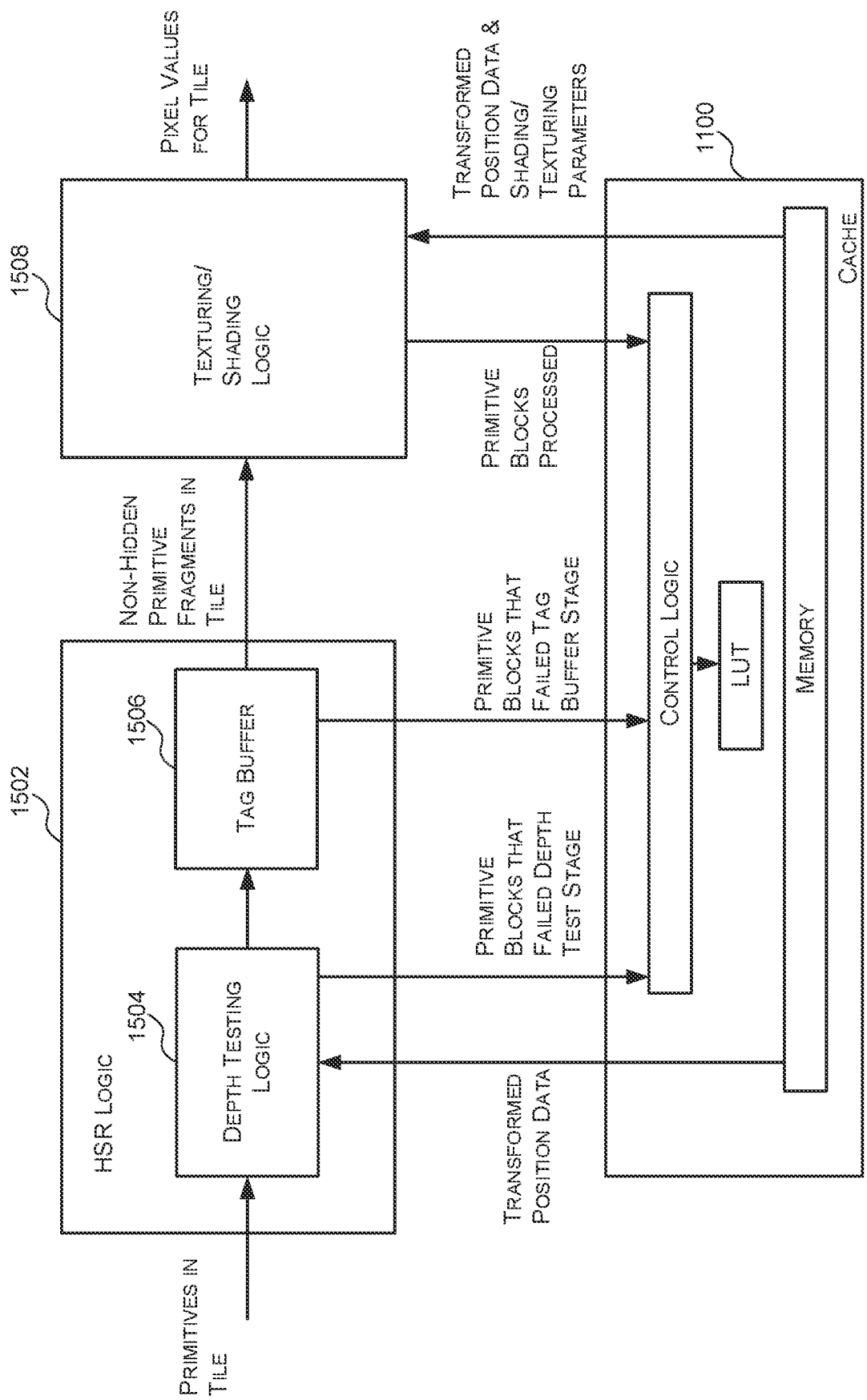
FIG. 15 is a block diagram of an example implementation of the HSR logic and the texturing/shading logic.

In some cases, the HSR phase may comprise two sub-stages—a first sub-stage in which depth testing is performed on primitive fragments in a tile, and a second sub-stage in which the primitive fragments that survive the depth testing are stored in a tag buffer. For example, FIG. 15 illustrates example HSR logic 1502 (which may be used to implement the HSR logic 314 of FIG. 3) that comprises depth testing logic 1504 and a tag buffer 1506. The depth testing logic 1504 receives primitive fragments and compares the depth value (e.g. Z value or Z co-ordinate) of the primitive fragments to the corresponding depth value in a depth buffer for the tile. Specifically, the depth buffer stores the 'best' depth value (e.g. the one that is closest to the screen) for each sample of the tile. If the received primitive fragment has a 'worse' depth value (e.g. a depth value that indicates it is further away from the screen) than the corresponding depth value in the depth buffer, then the primitive fragment will be hidden by another primitive and so the primitive fragment 'fails' the depth test and is not output to the tag buffer. If, however, the received primitive fragment has a 'better' depth value (i.e. a depth value that indicates it is closer to the screen) than the corresponding depth value in the depth buffer the primitive fragment 'passes' the depth test. The primitive fragment is then output to the tag buffer 1506 and the corresponding depth value in the depth buffer is updated to indicate there is a new 'best' depth value.

The tag buffer 1506 receives primitive fragments that have passed the depth test stage and for each received primitive fragment updates the tag buffer 1506 to identify that the received primitive fragment is the primitive fragment that is visible at its sample position. For example, if the tag buffer 1506 receives a primitive fragment x at sample location a then the tag buffer 1506 stores information indicating that the primitive fragment x is visible at sample location a. If the tag buffer 1506 subsequently receives a primitive fragment y at sample location, a then the tag buffer updates the information for sample location a to indicate that in fact it is primitive fragment y that is visible. Accordingly, in a simple case where all of the primitives are opaque, after all the primitives in a tile have been processed by the depth testing logic 1504 the tag buffer 1506 comprises the identity of the primitive fragments that are visible at each sample location. At this point the tag buffer 1506 is flushed to the texturing/shading logic 1508 where texturing and shading are performed on the primitive fragments that are visible. By performing the texturing and shading after hidden surface removal time and resources are not wasted texturing and shading primitives/primitive fragments which are not visible in the final image.

Accordingly, it is possible for a primitive (primitive fragment) to fail at the depth test sub-stage or fail at the tag buffer sub-stage. Specifically, it may fail the depth test and thus not be output by the depth testing logic 1504, or it may pass the depth test because at the time the depth test is performed it has the 'best' depth but later on a primitive fragment at the same sample position may come along with a better depth and thus it is overwritten in the tag buffer 1506 thus it is never output from the tag buffer 1506. In these cases, the efficiency of the transformed geometry cache 1100 may be further improved, by in addition to updating the counter for a transformed primitive block in the cache based on the output of the HSR stage, also updating the counter for a transformed primitive block based on the output of the tag buffer stage. This would allow the transformed primitive blocks which fail the depth testing or tag buffer stage, and thus are not required further by the HSR logic 1502 or the texturing/shading logic 1508, to be eligible for eviction sooner.

In these cases, the depth testing logic 1504 may be configured to notify the control logic 1106 when it detects that a primitive block has failed the depth-test stage. A primitive block is said to have failed the depth test if none of the primitives of that primitive block that fall within the tile being processed pass the depth testing. In other words, a primitive block will have failed the depth test if the depth testing indicates that none of the primitives of that primitive block that fall within the tile being processed are visible. In response to receiving an indication from the depth testing logic 1504 that a primitive block has failed the depth test, the control logic 1106 may update (e.g. decrement) the counter associated with the primitive block to indicate that one less tile is currently being processed by the rasterization logic that requires access to the corresponding transformed primitive block.

Similarly, the tag buffer 1506 may be configured to notify the control logic 1106 when it detects that a primitive block has failed the tag buffer stage. A primitive block is said to have failed the tag buffer stage if the tag buffer 1506 received at least one primitive fragment for a primitive in that primitive block, but none of the primitive fragments for that primitive block were output from the tag buffer 1506 to the next module (e.g. the texturing/shading logic 1508). To be able to determine when primitive blocks have failed the tag buffer stage it is desirable for the tag buffer 1506 to have a mechanism for tracking which primitive fragments were received since the entries of the tag buffer itself can be overwritten. Accordingly, in some cases the tag buffer 1506 may have a look-up table, or similar structure, which has an entry for each primitive block which indicates whether or not it has received a primitive fragment for that primitive block from the depth testing logic 1504. Then when the tag buffer 1506 is flushed (e.g. the contents thereof are sent to the next stage—e.g. the texturing/shading logic 1508) the contents of the tag buffer 1506 are compared to the look-up table and if there are any primitive blocks for which a primitive fragment was received but no primitive fragments related thereto are being output the tag buffer 1506 notifies the control logic 1106 that those primitive blocks failed the tag buffer stage and thus are no longer required. The notification may take any suitable form. For example the notification may take the form of a control signal.

As described above, a texturing/shading stage is configured to perform texturing and/or shading on the primitive fragments received from the HSR stage to determine pixel values of a rendered image. The rendered pixel values for a tile are then stored in memory (e.g. frame buffer). Accordingly the control logic 1106 may be configured to determine that a tile associated with a primitive block no longer requires access to the corresponding transformed primitive block if the texturing/shading stage (e.g. texturing/shading logic 1508) indicates that it has finished processing the primitives of a primitive block. For example, when the texturing/shading logic has finished processing the primitive fragments of a primitive block it may notify the control logic 1106. In response to receiving such a notification the control logic 1106 may update (e.g. decrement) the counter for that primitive block to indicate that there is one less tile that is currently being processed by the rasterization logic that requires access to the transformed primitive block. In other cases the control logic 1106 may be configured to determine that a tile associated with a primitive block no longer requires access to the corresponding transformed primitive block as soon as the texturing/shading stage has accessed the transformed primitive block (and fetched all relevant transformed geometry data). In this way the transformed primitive block may eligible for evicted from the cache 1100 earlier, which may improve the efficiency of the cache 1100.

In cases where there can be multiple tiles 'in-flight' (i.e. being processed by) in the rasterization logic 306 at any point in time it is possible that the counter for a primitive block may be updated (e.g. incremented) multiple times to indicate that there is an additional tile 'in-flight' that requires access to the corresponding transformed primitive block before the counter is updated (e.g. decremented) to indicate that there is one less tile 'in-flight' that requires access to the corresponding transformed primitive block. For example, the rasterization logic 306 may start processing a first tile that is associated with a particular primitive block which causes the control logic to increment the counter to 1 for that primitive block and before the control logic 1106 has determined that the first tile no longer requires access to that transformed primitive block the rasterization logic 306 may start processing a second tile that is also associated with the particular primitive block which causes the control logic to increment the counter to 2 for that primitive block. Therefore when the control logic detects that the first tile no longer requires access to that transformed primitive block (e.g. because it failed the depth testing stage, it failed the tag buffer stage, or texturing/shading thereof is complete) the transformed primitive block does not become eligible for eviction because there is still one tile that is in-flight that needs access to the transformed primitive block. As a result, updating (e.g. decrementing) a counter to indicate that there is one less tile currently being processed by the rasterization logic 306 that requires access to the transformed primitive block may not automatically cause a transformed primitive block to be eligible for eviction.

Returning to the method 1400 of FIG. 14, at block 1406, the control logic 1106 receives a new transformed primitive block (e.g. from the transformation logic 313) for storing in the cache. At block 1408 it is determined whether the cache 1100 is full. The cache may be determined to be full if there is not enough free memory in the cache to store the new transformed primitive block. If it is determined that the cache is full then the method 1400 proceeds to block 1410. If, however, it is determined that the cache is not full then the method 1400 proceeds directly to block 1414.

At block 1410, one of the transformed primitive blocks stored in the cache 1100 (e.g. the memory 1102) is selected for eviction based on the counters associated therewith. As described above, the counters indicate the number of tiles that are currently being processed by the rasterization logic 306 (e.g. are 'in-flight') that require access to the transformed primitive block. Generally it is not safe to evict a transformed primitive block from the cache 1100 unless there are no tiles currently being processed by the rasterization logic that require access to the transformed primitive block. Accordingly, in some cases, one of the transformed primitive blocks that are associated with a counter that indicates that there are no tiles currently being processed by the rasterization logic that require access to the transformed primitive block is selected for eviction. As described above, in some cases a counter will have a zero value when there are no tiles currently being processed by the rasterization logic that require access to the corresponding transformed primitive block. In these cases, one of the transformed primitive blocks in the cache that have a counter with a zero value may be selected for eviction.

When there is more than one transformed primitive block with a counter that indicates that there are no tiles currently being processed that require access to the transformed primitive block (e.g. a counter with a zero value) one of those transformed primitive blocks may be selected for eviction in any suitable manner. For example, one of those transformed primitive blocks may be randomly selected for eviction.

As described above, each primitive block may be referenced by (or associated with) a plurality of tiles. In other words, the primitives of a primitive block may fall, at least partially within, a plurality of tiles. In some cases, the tiling engine 310 may be configured keep track of the number of tiles that reference (or are associated with) each primitive block and this information may be provided to the fetch logic 312 when a primitive block is fetched from memory $302_2$. For example, the number of tiles that reference (or are associated) with a particular primitive block may be stored, for example, in the header portion of the primitive block or the number of tiles that reference (or are associated with) a particular primitive block may be provided to the fetch logic 312 as sideband data. In these cases, the control logic 1106 may be configured to maintain a secondary counter (e.g. in the LUT 1104) for each primitive block that indicates the number of tiles that still require access to that primitive block. The secondary counter for a primitive block may be initially set to the number of tiles that reference (or are associated with) that primitive block as received from the tiling engine and the control logic 1106 may be configured to update (e.g. decrement) the counter at the same time the primary counters are updated (e.g. decremented) to indicate that there is one less tile currently being processed by the rasterization logic that requires access to the transformed primitive block. The control logic 1106 may then use these secondary counters to select which of the transformed primitive blocks with a counter that indicates that there are no tiles currently being processed by the rasterization logic that require access to that transformed primitive block to evict. For example, the control logic may select the (or one of) the transformed primitive blocks with the lowest secondary counter.

If there are no transformed primitive blocks for which the associated counter indicates that there are no tiles currently being processed by the rasterization logic that require access to the transformed primitive block, then the control logic 1106 may wait until one of the counters is adjusted to indicate that there are no tiles currently being processed by the rasterization logic which require access to the corresponding transformed primitive block (e.g. until a counter is set to zero). Alternatively, in cases with a tag buffer wherein flush of the tag buffer causes the tag buffer to notify the control logic 1106 of primitive blocks that did not pass the tag buffer stage then the control logic 1106 may be configured to cause a flush of the tag buffer. In some cases, the control logic 1106 may initiate a flush of the whole rasterization pipeline or pipelines by sending a flag down the rasterization pipeline. The flag will eventually reach the tag buffer and trigger a tag buffer refresh. However, by the time the flag reaches the tag buffer it may have already have been flushed so before performing a refresh the tag buffer may first check whether the cache 1100 is still full. If the cache is not still full then the tag buffer may not be flushed. If, however, it is stull full the tag buffer may be flushed. While this may cause the tag buffer to be flushed before the HSR processing of the entire tile is complete, this will not typically cause an issue with downstream components as the downstream components (e.g. texturing/shading logic) will be able to figure out which primitives are visible. It may merely result in the downstream component performing work on primitives (e.g. texturing and shading) that are not visible and would have been culled in the tag buffer stage had the tag buffer not been flushed early.

At block 1412, the transformed primitive block selected in block 1410 is evicted from the cache 1100 (e.g. from the memory 1102) to make space for the new transformed primitive block. Once the selected transformed primitive block is evicted from the cache (e.g. from the memory 1102) the method 1400 may proceed to block 1414 where the new transformed primitive block is stored in the cache 1100 (e.g. in the memory 1102).

Figure 16:
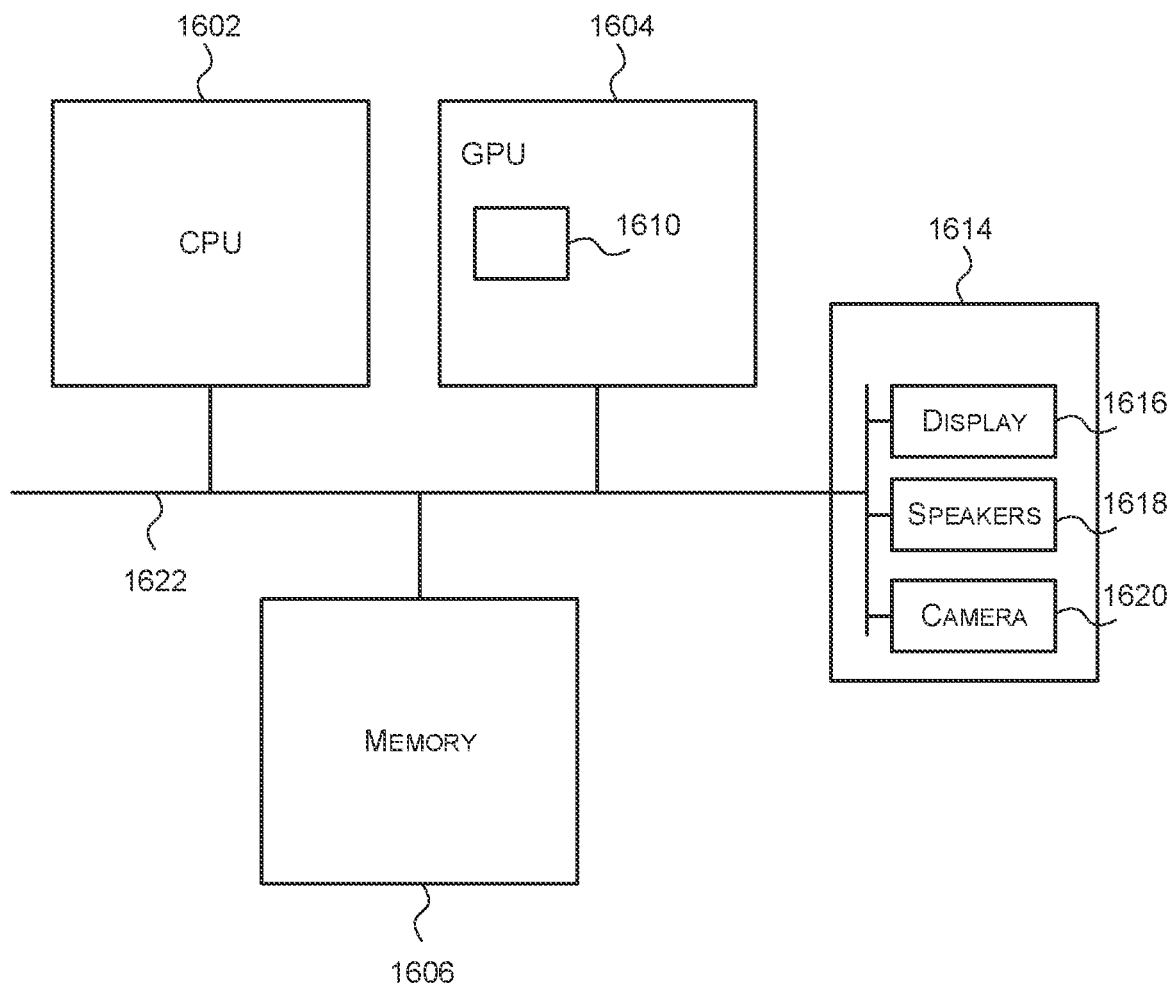
FIG. 16 is a block diagram of an example computer system in which the graphics processing systems, primitive block generators and transformed geometry data caches described herein may be implemented.

FIG. 16 shows a computer system in which the graphics processing systems, the primitive block generators and/or the caches described herein may be implemented. The computer system comprises a CPU 1602, a GPU 1604, a memory 1606 and other devices 1614, such as a display 1616, speakers 1618 and a camera 1620. A block 1610 (corresponding to the graphics processing system 300, the primitive block generator 1000, or the cache 1100) is implemented on the GPU 1604. In other examples, the block 1610 may be implemented on the CPU 1602. The components of the computer system can communicate with each other via a communications bus 1622.

The graphics processing systems 100, 200, 300, the primitive block generator 1000 and the cache 1100 of FIGS. 1, 2, 3, 10 and 11 are shown as comprising a number of functional blocks. This is schematic only and is not intended to define a strict division between different logic elements of such entities. Each functional block may be provided in any suitable manner. It is to be understood that intermediate values described herein as being formed by a graphics processing system, primitive block generator or cache need not be physically generated by the graphics processing system, primitive block generator or cache at any point and may merely represent logical values which conveniently describe the processing performed by the graphics processing system, primitive block generator or cache between its input and output.

The graphics processing systems, primitive block generators and caches described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a computing device comprising any apparatus described herein. An integrated circuit definition dataset may be, for example, an integrated circuit description.

Therefore, there may be provided a method of manufacturing, at an integrated circuit manufacturing system, a graphics processing system, a primitive block generator or a cache as described herein. Furthermore, there may be provided an integrated circuit definition dataset that, when processed in an integrated circuit manufacturing system, causes the method of manufacturing a graphics processing system, a primitive block generator or a cache as described herein to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system, a primitive block generator, or a cache as described herein will now be described with respect to FIG. 17.

Figure 17:
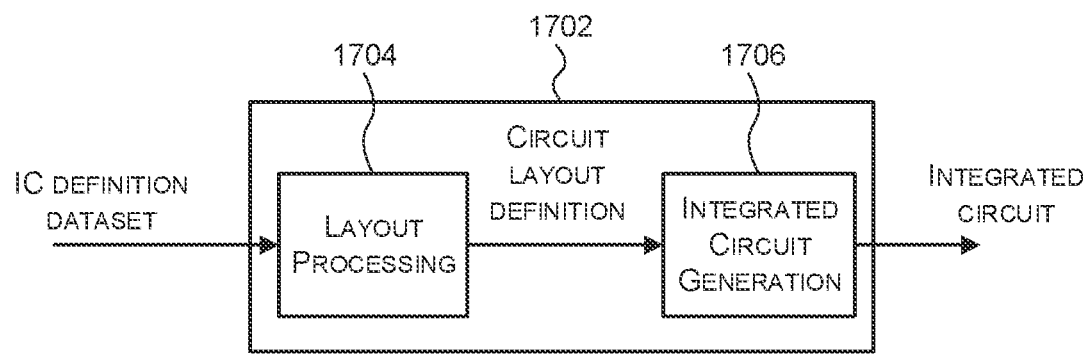
FIG. 17 is a block diagram of an example integrated circuit manufacturing system which can be used to generate an integrated circuit embodying any of the graphics processing systems, primitive block generators and transformed geometry data caches described herein.

FIG. 17 shows an example of an integrated circuit (IC) manufacturing system 1702 which is configured to manufacture a graphics processing system, a primitive block generator or a cache as described in any of the examples herein. In particular, the IC manufacturing system 1702 comprises a layout processing system 1704 and an integrated circuit generation system 1706. The IC manufacturing system 1702 is configured to receive an IC definition dataset (e.g. defining a graphics processing system, a primitive block generator or a cache as described in any of the examples herein), process the IC definition dataset, and generate an IC according to the IC definition dataset (e.g. which embodies a graphics processing system, a primitive block generator or a cache as described in any of the examples herein). The processing of the IC definition dataset configures the IC manufacturing system 1702 to manufacture an integrated circuit embodying a graphics processing system, a primitive block generator or a cache as described in any of the examples herein.

The layout processing system 1704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1704 has determined the circuit layout it may output a circuit layout definition to the IC generation system 1706. A circuit layout definition may be, for example, a circuit layout description.

The IC generation system 1706 generates an IC according to the circuit layout definition, as is known in the art. For example, the IC generation system 1706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1706 may be in the form of computer-readable code which the IC generation system 1706 can use to form a suitable mask for use in generating an IC.

The different processes performed by the IC manufacturing system 1702 may be implemented all in one location, e.g. by one party. Alternatively, the IC manufacturing system 1702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system, a primitive block generator or a cache as described herein without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 17 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 17, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of generating primitive blocks at a primitive block generator in a graphics processing system, the primitive block generator comprising a data store for storing a current primitive block to which transformed primitives can be associated, the method comprising:

determining one or more distance metrics that indicate a distance between a spatial position of a set of one or more transformed primitives in a rendering space and a spatial position of the transformed primitives associated with the current primitive block in the rendering space;

determining a fullness metric based on at least one of: (i) a number of transformed primitives associated with the current primitive block compared to a maximum number of primitives, and (ii) where each transformed primitive is defined by one or more transformed vertices, a number of transformed vertices associated with the current primitive block compared to a maximum number of vertices;

dynamically selecting a set of one or more distance thresholds based on the fullness metric, the set of one or more distance thresholds comprising a distance threshold for each of the one or more distance metrics;

determining whether to associate the set of one or more transformed primitives with the current primitive block based on a comparison of each of the one or more distance metrics to the corresponding distance threshold of the set of one or more distance thresholds; and in response to determining that the set of one or more transformed primitives is to be associated with the current primitive block, associating the set of one or more transformed primitives with the current primitive block.

2. The method of claim 1, wherein the current primitive block is an untransformed primitive block, and the set of one or more transformed primitives is associated with the current primitive block by adding information to the current primitive block identifying untransformed geometry data from which the set of one or more transformed primitives was generated.

3. The method of claim 2, wherein the set of one or more transformed primitives comprises a plurality of transformed primitives generated from a same untransformed geometry data.

4. The method of claim 2, wherein the set of one or more transformed primitives comprises a single transformed primitive of a plurality of transformed primitives generated from a same untransformed geometry data.

5. The method of claim 4, wherein associating the set of one or more transformed primitives with the current primitive block further comprises adding information to the current primitive block identifying the single transformed primitive of the plurality of transformed primitives.

6. The method of claim 1, wherein the current primitive block is a transformed primitive block, and the set of one or more transformed primitives is associated with the current primitive block by adding the set of one or more transformed primitives to the current primitive block.

7. The method of claim 6, wherein adding the set of one or more transformed primitives to the current primitive block comprises adding transformed geometry data related to the set of one or more transformed primitives to the current primitive block.

8. The method of claim 1, wherein selecting the set of one or more distance thresholds based on the fullness metric comprises selecting, when the fullness metric indicates a first fullness level, a first set of one or more distance thresholds, and selecting, when the fullness metric indicates a second, different, fullness level, a second, different, set of one or more distance thresholds.

9. The method of claim 1, wherein selecting the set of one or more distance thresholds based on the fullness metric comprises selecting a predetermined set of one or more distance thresholds of a plurality of predetermined sets of one or more distance thresholds associated with a fullness range encompassing a fullness level indicated by the fullness metric.

10. The method of claim 1, wherein the set of one or more transformed primitives is associated with render state data and the current primitive block is associated with render state data, and the method further comprises, determining whether the render state data for the set of one or more transformed primitives matches the render state data for the current primitive block, and only associating the set of one or more transformed primitives with the current primitive block if it is determined that the render state data for the set of one or more transformed primitives matches the render state data for the current primitive block.

11. The method of claim 1, wherein it is determined that the set of one or more transformed primitives is not to be associated with the current primitive block if at least one of the one or more distance metrics exceeds the corresponding distance threshold of the set of one or more distance thresholds.

12. The method of claim 1, wherein it is determined that the set of one or more transformed primitives is not to be associated with the current primitive block only if each of the one or more distance metrics exceeds the corresponding distance threshold of the set of one or more distance thresholds.

13. The method of claim 1, wherein at least one of the one or more distance metrics is based on a first bounding box that encloses the transformed primitives associated with the current primitive block and a second bounding box that encloses the transformed primitives associated with the current primitive block and the set of one or more transformed primitives.

14. The method of claim 13, wherein at least one of the one or more distance metrics is based on at least one of: (i) a ratio of a first dimension of the second bounding box and the first dimension of the first bounding box; (ii) a ratio of a second dimension of the second bounding box and the second dimension of the first bounding box; and (iii) a ratio of an area of the second bounding box and an area of the first bounding box.

15. The method of claim 1, wherein the rendering space is divided into a plurality of tiles, and at least one of the one or more distance metrics is based on a rendering order of the plurality of tiles.

16. The method of claim 1, further comprising:
subsequent to associating the set of one or more transformed primitives with the current primitive block, determining whether a fullness criteria is met; and
in response to determining that the fullness criteria is met, outputting the current primitive block from the data store.

17. The method of claim 1, further comprising, if it is determined that the set of one or more transformed primitives is not to be associated with the current primitive block, outputting the current primitive block from the data store and associating the set of one or more transformed primitives with a new current primitive block stored in the data store.

18. A primitive block generator for a graphics processing system for generating primitive blocks, the primitive block generator comprising:
a data store configured to store a current primitive block to which transformed primitives can be associated; and block allocation logic comprising:
- distance calculation logic configured to determine one or more distance metrics that indicate a distance between a spatial position of a set of one or more transformed primitives in a rendering space and a spatial position of the transformed primitives associated with the current primitive block in the rendering space,
- fullness determination logic configured to determine a fullness metric based on at least one of: (i) a number of transformed primitives associated with the current primitive block compared to a maximum number of primitives, and (ii) where each transformed primitive is defined by one or more transformed vertices, a number of transformed vertices associated with the current primitive block compared to a maximum number of vertices,
- distance threshold selection logic configured to dynamically select a set of one or more distance thresholds based on the fullness metric, the set of one or more distance thresholds comprising a distance threshold for each of the one or more distance metrics, and
- comparison logic configured to:
  - determine whether to associate the set of one or more transformed primitives with the current primitive block based on a comparison of each of the one or more distance metrics to the corresponding distance threshold of the set of one or more distance thresholds, and
  - in response to determining that the set of one or more transformed primitives is to be associated with the current primitive block, associate the set of one or more transformed primitives with the current primitive block.

19. A non-transitory computer readable storage medium having stored thereon computer readable instructions that, when executed at a computer system, cause the computer system to perform the method as set forth in claim 1.

20. A non-transitory computer readable storage medium having stored thereon a computer readable dataset description of the primitive block generator as set forth in claim 18 that, when processed in an integrated circuit manufacturing system, causes the integrated circuit manufacturing system to manufacture an integrated circuit embodying the primitive block generator.

* * * * *